(12) United States Patent
Kawai

(10) Patent No.: US 9,725,562 B2
(45) Date of Patent: Aug. 8, 2017

(54) MODIFIED DIENE POLYMER, METHOD FOR PRODUCING SAME, RUBBER COMPOSITION, AND PNEUMATIC TIRE

(71) Applicant: Toyo Tire & Rubber Co., Ltd., Osaka-shi, Osaka (JP)

(72) Inventor: Nobutomo Kawai, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 221 days.

(21) Appl. No.: 14/758,426

(22) PCT Filed: Dec. 11, 2013

(86) PCT No.: PCT/JP2013/007294
§ 371 (c)(1),
(2) Date: Jun. 29, 2015

(87) PCT Pub. No.: WO2014/108958
PCT Pub. Date: Jul. 17, 2014

(65) Prior Publication Data
US 2015/0353690 A1   Dec. 10, 2015

(30) Foreign Application Priority Data

| Jan. 9, 2013 | (JP) | ................................. 2013-001569 |
| Jan. 9, 2013 | (JP) | ................................. 2013-001570 |
| Jan. 9, 2013 | (JP) | ................................. 2013-001571 |
| Jan. 9, 2013 | (JP) | ................................. 2013-001572 |

(51) Int. Cl.
| C08C 19/06 | (2006.01) |
| C08J 3/24 | (2006.01) |
| C08K 3/36 | (2006.01) |
| C08K 3/04 | (2006.01) |
| C08C 19/08 | (2006.01) |

(52) U.S. Cl.
CPC ................ C08J 3/24 (2013.01); C08C 19/06 (2013.01); C08C 19/08 (2013.01); C08K 3/04 (2013.01); C08K 3/36 (2013.01); *C08J 2307/00* (2013.01); *C08K 2003/045* (2013.01)

(58) Field of Classification Search
CPC ................................ C08C 19/06; C08C 19/08
See application file for complete search history.

(56) References Cited

U.S. PATENT DOCUMENTS

| 4,851,556 | A | * | 7/1989 | Siegmeier | ............... C08C 19/06 |
| | | | | | 549/525 |
| 5,622,998 | A | | 4/1997 | Tanaka et al. | |
| 6,133,388 | A | | 10/2000 | Lee et al. | |
| 2004/0266937 | A1 | | 12/2004 | Yagi et al. | |
| 2007/0010610 | A1 | | 1/2007 | Kondo | |
| 2011/0028653 | A1 | * | 2/2011 | Wang | ........................ C08F 8/00 |
| | | | | | 525/207 |
| 2012/0323037 | A1 | * | 12/2012 | Pilard | ..................... C08C 19/08 |
| | | | | | 560/262 |
| 2014/0364536 | A1 | | 12/2014 | Kawai | |

FOREIGN PATENT DOCUMENTS

| EP | 2 341 101 | A1 | 7/2011 |
| JP | 8-81505 | A | 3/1996 |
| JP | 2000-248014 | A | 9/2000 |
| JP | 2004-331821 | A | 11/2004 |
| JP | 2004-359716 | A | 12/2004 |
| JP | 2004-359773 | A | 12/2004 |
| JP | 2005-41960 | A | 2/2005 |
| JP | 2005-232261 | A | 9/2005 |
| JP | 2010-106250 | A | 5/2010 |
| JP | 2010-248388 | A | 11/2010 |
| WO | 2013/118496 | A1 | 8/2013 |

OTHER PUBLICATIONS

International Search Report dated Jan. 14, 2014, issued in corresponding application No. PCT/JP2013/007294 (2 pages).
Office Action dated Mar. 3, 2016, issued in counterpart Chinese Patent Application No. 201380069864.2, with English translation. (9 pages).

\* cited by examiner

*Primary Examiner* — Peter D Mulcahy
(74) *Attorney, Agent, or Firm* — Westerman, Hattori, Daniels & Adrian, LLP

(57) ABSTRACT

A modified diene polymer is obtained by decomposing a diene polymer having a carbon-carbon double bond in a main chain by oxidative cleavage of the carbon-carbon double bond to reduce a molecular weight, changing acido-basic properties of a system containing polymer fragments obtained such that the system is changed into a basic system when the system is acidic and the system is changed into an acidic system when the system is basic to combine the polymer fragments, thereby obtaining an intermediate polymer having an altered structure, and epoxidizing a carbon-carbon double bond moiety of a main chain of the intermediate polymer.

23 Claims, No Drawings

MODIFIED DIENE POLYMER, METHOD FOR PRODUCING SAME, RUBBER COMPOSITION, AND PNEUMATIC TIRE

TECHNICAL FIELD

The present invention relates to a modified diene polymer, a method for producing the same, a rubber composition using the modified diene polymer, and a pneumatic tire.

BACKGROUND ART

Diene polymer is used as, for example, a rubber component in a rubber composition. It is required in a rubber composition, particularly a rubber composition for a tire, to improve rolling resistance performance related to low fuel consumption, and wet performance that is grip performance on a wet road surface. However, rolling resistance performance and wet performance have the antinomic relationship, and it is not easy to improve those performances simultaneously. For example, a glass transition point is operated by changing an amount of styrene in a styrene-butadiene rubber, thereby wet performance can be improved. However, only the operation of a glass transition point deteriorates rolling resistance performance.

It is conventionally known to modify a diene polymer, and it is proposed to improve rolling resistance performance and wet performance by the operation of polarity by, for example, grafting onto a polymer chain, modification of a terminal, or addition of a functional group (for example, see PTLs 1 to 6 below). However, it is not easy to simultaneously improve rolling resistance performance and wet performance. Furthermore, there is no conventional art to easily introduce a functional group in a main chain structure, regardless of solution polymerization or emulsion polymerization.

PTL 7 below discloses a depolymerized natural rubber useful as an adhesive, a pressure-sensitive adhesive or the like. PTL 7 produces a liquid depolymerized natural rubber having a number average molecular weight of from 2,000 to 50,000 by air oxidation of a deproteinized natural rubber dissolved in an organic solvent in the presence of a metal catalyst to perform depolymerization. PTL 7 discloses that a main chain is decomposed by air oxidation to form a molecular chain having a carbonyl group at one terminal and a formyl group at other terminal, and the formyl group is then recombined by aldol condensation. However, in PTL 7, depolymerization is conducted in a solution of an organic solvent, and it is not disclosed that the recombination is performed by changing a system containing decomposed polymers from an acidic system to a basic system or from a basic system to an acidic system.

CITATION LIST

Patent Literature

PTL 1: JP-A-2000-248014
PTL 2: JP-A-2005-232261
PTL 3: JP-A-2004-359716
PTL 4: JP-A-2005-041960
PTL 5: JP-A-2004-359773
PTL 6: JP-A-2010-106250
PTL 7: JP-A-08-081505

SUMMARY OF INVENTION

Technical Problem

The present inventors propose a novel modification method of a diene polymer and a rubber composition containing a modified diene polymer in Japanese Patent Application No. 2012-27374 and Japanese Patent Application No. 2012-27376. The present invention relates to further improvement of such a modification method.

In one embodiment, it is an object to provide a novel modification method of a diene polymer. In more detail, it provides a method for producing a modified diene polymer that can easily introduce a functional group in a main chain structure. In other embodiment, it is an object to provide a novel diene polymer having a functional group introduced in a main chain. In still other embodiment, it is an object to provide a rubber composition containing the modified diene polymer and a pneumatic tire using the rubber composition.

Solution to Problem

The method for procuring a modified diene polymer according to an embodiment includes a step of decomposing a diene polymer having a carbon-carbon double bond in a main chain by oxidative cleavage of the carbon-carbon double bond, thereby obtaining polymer fragments having reduced molecular weight, a step of changing acido-basic properties of a system containing the polymer fragments such that the system is changed into a basic system when the system is acidic and the system is changed into a acidic system when the system is basic to combine the polymer fragments, thereby obtaining an intermediate polymer having an altered structure, and a step of epoxidizing a carbon-carbon double bond moiety in a main chain of the intermediate polymer.

The method for producing a modified diene polymer according to another embodiment is a method of using a diene polymer having a carbon-carbon double bond as a main chain and further having an epoxy group formed by oxidation of a double bond moiety of the main chain, the method including a step of decomposing the diene polymer by oxidative cleavage of the carbon-carbon double bond to obtain polymer fragments having reduced molecular weight, and a step of changing acido-basic properties of a system containing the polymer fragments such that the system is changed into a basic system when the system is acidic and the system is changed into an acidic system when the system is basic to combine the polymer fragments, thereby obtaining a polymer having an altered structure.

The modified diene polymer according to an embodiment has at least one linking group selected from the group consisting of linking groups represented by the following formulae (1) to (4) in the molecule and has a structure in which diene polymer chains containing epoxy groups formed by oxidation of a double bond moiety of a main chain and/or hydroxyl groups directly bonded to the main chain are linked through the linking group.

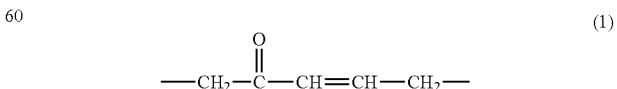

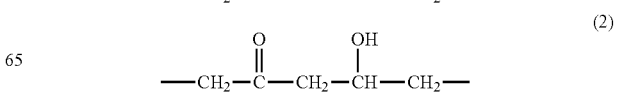

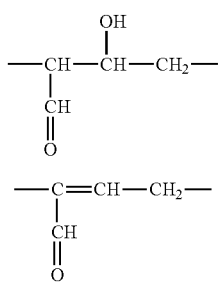

The rubber composition according to an embodiment contains a filler in an amount of from 5 to 150 parts by mass per 100 parts by mass of a rubber component containing the modified diene polymer.

The pneumatic tire according to an embodiment comprises the rubber composition.

Advantageous Effects of Invention

According to the present embodiment, a diene polymer is decomposed by oxidative cleavage of a double bond in a main chain to once reduce its molecular weight, and the diene polymers decomposed are then recombined by changing acido-basic properties of a system containing the diene polymers decomposed. Since a functional group is introduced in a combination point (linking group) when recombining, a functional group such as a carbonyl group can be easily introduced in a main chain structure. Furthermore, by epoxidizing a double bond moiety in a main chain together with the introduction of a functional group in such a linking group, for example, a glass transition point can be easily shifted to a high temperature side.

DESCRIPTION OF EMBODIMENTS

[First Embodiment]

The method for producing a modified diene polymer according to a first embodiment is that after decomposing a diene polymer by oxidative cleavage of a carbon-carbon double bond, acido-basic properties of a system containing polymer fragments obtained are changed to combine the polymer fragments, thereby obtaining an intermediate polymer having an altered structure. Thereafter, a carbon-carbon double bond moiety in a main chain of the intermediate polymer is epoxidized to obtain a modified diene polymer. Thus, in the first embodiment, after conducting dissociation combining of the diene polymer, an epoxy group is introduced in a main chain of the polymer.

In the present embodiment, a diene polymer having a carbon-carbon double bond in a repeating unit of the main chain is used as a polymer to be modified. The diene polymer is a polymer obtained using a conjugated diene compound such as butadiene, isoprene, chloroprene, 2,3-dimethyl-1,3-butadiene, 2-methyl-1,3-pentadiene or 1,3-hexadiene as at least a part of a monomer. Those conjugated diene compounds may be used in one kind alone or as mixtures of two or more kinds. The diene polymer includes a copolymer of a conjugated diene compound and another monomer other than the conjugated diene compound. Examples of the other monomer include aromatic vinyl compounds such as styrene, α-methylstyrene, 2-methylstyrene, 3-methylstyrene, 4-methylstyrene and 2,4-diisopropylstyrene; and various vinyl compounds such as ethylene, propylene isobutylene, acrylonitrile and acrylic acid ester. Those vinyl compounds may be used in one kind along or mixtures of two or more kinds.

Various diene rubber polymers having an isoprene unit and/or a butadiene unit in the molecule are preferably used as the diene polymer. Examples of the diene polymer include natural rubber (NR), synthetic isoprene rubber (IR), butadiene rubber (BR), styrene-butadiene rubber (SBR), nitrile rubber (NBR), chloroprene rubber (CR), butyl rubber (IIR), styrene-isoprene copolymer rubber, butadiene-isoprene copolymer rubber and styrene-isoprene-butadiene copolymer rubber. Of those, natural rubber, synthetic isoprene rubber, butadiene rubber or styrene-butadiene rubber is preferably used, and natural rubber or synthetic isoprene rubber is particularly preferably used.

It is preferred to use a diene polymer having a number average molecular weight of 60,000 or more as the diene polymer to be modified. The reason for this is that a polymer that is solid at ordinary temperature (23° C.) is used as a preferred embodiment. For example, in order that rubber polymer does not undergo plastic deformation in the state that force is not applied at ordinary temperature when directly processing the rubber polymer as a material, it is preferred that the number average molecular weight is 60,000 or more. The term "solid" used herein means the state free of fluidity. The number average molecular weight of the polymer is preferably from 60,000 to 1,000,000, more preferably from 80,000 to 800,000, and still more preferably from 100,000 to 600,000.

The polymer dissolved in a solvent can be used as the diene polymer to be modified. Preferably, an aqueous emulsion in a micelle state in water that is a protonic solvent, that is, a latex, is used. By using an aqueous emulsion, after decomposing the polymer, a recombination reaction can be induced by changing acido-basic properties of a reaction field while maintaining the state. Concentration of the aqueous emulsion (solid concentration of a polymer) is not particularly limited, but is preferably from 5 to 70 mass %, and more preferably from 10 to 50 mass %. Where the solid concentration is too high, emulsion stability is deteriorated, and micelle is easy to be broken in response to pH fluctuation of a reaction field, and this is not suitable for a reaction. On the other hand, where the solid concentration is too small, reaction rate becomes slow, resulting in poor practical use.

Oxidizing agent can be used for oxidative cleavage of a carbon-carbon double bond of the diene polymer. For example, the oxidative cleavage can be performed by adding an oxidizing agent to an aqueous emulsion of the diene polymer, followed by stirring. Examples of the oxidizing agent include manganese compounds such as potassium permanganate or manganese oxide; chromium compounds such as chromic acid or chromium trioxide; peroxides such as hydrogen peroxide; perhalogen acids such as periodic acid; and oxygens such as ozone or oxygen. Of those, periodic acid is preferably used. When periodic acid is used, it is easy to control a reaction system. Furthermore, since a water-soluble salt is formed, the water-soluble salt can remain in water when coagulating and drying a modified polymer, and the amount remaining in the modified polymer is small. In performing oxidative cleavage, metal type oxidation catalysts such as a salt or complex of a metal such as cobalt, copper or iron with a chloride or an organic compound may be used together, and for example, air oxidation may be performed in the presence of the metal type oxidation catalyst.

The diene polymer is decomposed by the oxidative cleavage, and polymers having a carbonyl group (>C=O) or a formyl group (—CHO) at a terminal (that is, polymer fragments) are obtained. As one embodiment, the polymer fragments have a structure represented by the following formula (5) at the terminal

(5)

In the formula, $R^1$ represents a hydrogen atom, an alkyl group having from 1 to 5 carbon atoms, or a halogen group, and is more preferably hydrogen atom, methyl group or chloro group. For example, in the case where an isoprene unit has been cleaved, $R^1$ is a methyl group in one cleavage terminal, and $R^1$ is a hydrogen atom in the other cleavage terminal. In the case where a butadiene unit has been cleaved, $R^1$ is a hydrogen atom in both cleavage terminals. In the case where a chloroprene unit has been cleaved, $R^1$ is a chloro group in one cleavage terminal, and $R^1$ is a hydrogen atom in the other cleavage terminal. In more detail, the polymer fragment has the structure represented by the formula (5) in at least one terminal of the molecular chain. That is, a polymer in which the group represented by the formula (5) is directly bonded to one terminal or both terminals of a diene polymer chain is obtained as shown in the following formulae (6) and (7).

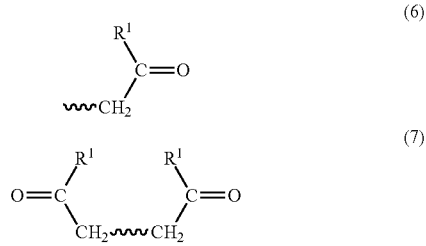

In the formulae (6) and (7), $R^1$ is a hydrogen atom, an alkyl group having from 1 to 5 carbon atoms or a halogen group, and a portion shown by a wave line is a diene polymer chain. For example, in the case where natural rubber has been decomposed, the portion shown by a wave line is a polyisoprene chain comprising a repeating unit of an isoprene unit. In the case where styrene-butadiene rubber has been decomposed, the portion shown by a wave line is a random copolymer chain containing a styrene unit and a butadiene unit.

The molecular weight is reduced by decomposing a diene polymer by the oxidative cleavage. The number average molecular weight of the polymer after decomposition is not particularly limited, but is preferably from 300 to 500,000, more preferably 500 to 100,000, and still more preferably from 1,000 to 50,000. The amount of a functional group after recombination can be controlled by a size of a molecular weight after decomposition. However, when the molecular weight on decomposition is too small, a combining reaction is easy to occur in the same molecule.

After decomposing the diene polymer as above, the polymers decomposed are recombined by changing acido-basic properties of a reaction system containing the decomposed polymers. That is, after decomposition, by changing acido-basic properties of a reaction field while maintaining the state, a combining reaction that is a reaction reverse to cleavage preferentially proceeds. The oxidative cleavage is a reversible reaction, and a cleavage reaction preferentially proceeds than a combining reaction as a reverse reaction. Therefore, a molecular weight is decreased until reaching equilibrium. In this case, when reversing acido-basic properties of a reaction field, a combining reaction in turn preferentially proceeds. Therefore, the molecular weight once reduced turns upward, and the molecular weight is increased until reaching equilibrium. As a result, a modified polymer (intermediate polymer) having a desired molecular weight is obtained. The structure of the formula (5) shows two kinds of tautomerism, and is classified into a structure that bonds to the original carbon-carbon double bond structure and a structure that forms a linking group represented by the following formulae (1) to (4). In the present embodiment, a polymer containing at least one linking group of the formulae (1) to (4) can be formed by prioritizing an aldol condensation reaction by controlling pH of a reaction field. In detail, in a solution of a reaction system, particularly an aqueous emulsion solution, pH is sometimes controlled for stabilization, and the pH on decomposition shifts to either of acidity or basicity depending on a method used for deposition or a kind or a concentration of a chemical used. For this reason, in the case where the reaction system on decomposition is acidic, the reaction system is made basic. On the other hand, in the case where the reaction system on decomposition is basic, the reaction system is made acidic.

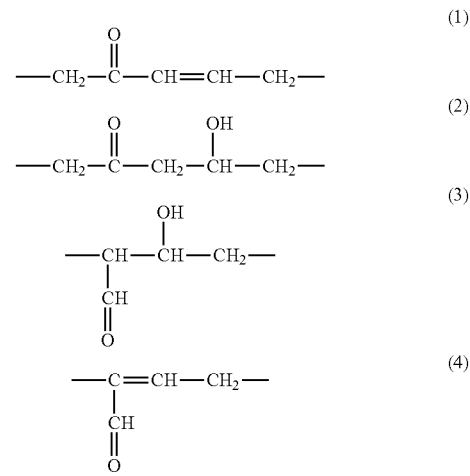

In the case where polymer fragments having a terminal structure wherein $R^1$ is hydrogen atom combine with each other, a linking group represented by the formula (3) is formed by an aldol condensation reaction, and a linking group represented by the formula (4) is formed by eliminating water from the linking group of the formula (3). In the case where a polymer fragment having a terminal structure wherein $R^1$ is a hydrogen atom is combined with a polymer fragment having a terminal structure wherein $R^1$ is a methyl group, a linking group represented by the formula (2) is formed by an aldol condensation reaction, and a linking group represented by the formula (1) is formed by eliminating water from the linking group of the formula (2). There is a case that a linking group other than the formulae (1) to (4) is formed, for example, a case that polymer fragments having a terminal structure wherein $R^1$ is a methyl group combine with each other. However, the amount of such a linking group is slight, and the linking groups of the formulae (1) to (4) are mainly formed.

In the case where the reaction system is changed into a basic system, pH of the reaction system when conducting a combining reaction is larger than 7. The pH is preferably from 7.5 to 13, and more preferably from 8 to 10. On the other hand, in the case where the reaction system is changed into an acidic system, pH of the reaction system is smaller than 7. The pH is preferably from 4 to 6.8, and more preferably from 5 to 6. The pH can be adjusted by adding an acid or a base to the reaction system. Although not particularly limited, examples of the acid include hydrochloric acid, sulfuric acid, nitric acid and phosphoric acid, and examples of the base include sodium hydroxide, potassium hydroxide, sodium carbonate and sodium hydrogen carbonate.

In conducting a combining reaction, an acid or base for adjusting pH acts as a catalyst of the combining reaction, and pyrrolidine-2-carboxylic acid may be further used as a catalyst for adjusting the reaction.

After obtaining an intermediate polymer having an altered structure by conducting the combining reaction as above, at least a part of a carbon-carbon double bond moiety in a main chain of the intermediate polymer is epoxidized. The epoxidization may be conducted to the whole double bond moiety contained in the main chain of the intermediate polymer. However, a part of the double bond moiety is generally epoxidized. Sometimes, the intermediate polymer contains a carbon-carbon double bond as a linking group as in the formulae (1) and (4). However, since those linking groups have a structure that a carbon-carbon double bond is not contained in an aqueous emulsion as in the formula (2) or (3), in the case of epoxidizing in an aqueous emulsion, a moiety other than the linking group is generally epoxidized.

The epoxidization method is not particularly limited, and it can be conducted using conventional various epoxidization methods for a diene rubber, such as a chlorohydrin method, a direct oxidation method, a hydrogen peroxide method, an alkyl hydroperoxy method and a peroxy acid method. Preferably a double bond moiety in a main chain of the intermediate polymer is epoxidized in a latex. In detail, a peroxide and an acid are added to a latex of the intermediate polymer after the combining reaction (that is, aqueous emulsion), and the reaction is conducted. As a result, a modified diene rubber having an epoxy group formed by oxidation of the double bond moiety of the main chain is obtained.

After the epoxidization as above, the aqueous emulsion is coagulated and dried, and a modified diene polymer that is solid at ordinary temperature is obtained.

[Second Embodiment]

The method for producing a modified diene polymer according to a second embodiment is that after epoxidizing the intermediate polymer in the first embodiment, at least a part of epoxy groups formed is hydroxylated to obtain a modified diene polymer. Thus, in the second embodiment, after conducting dissociation combining of the diene polymer, an epoxy group is introduced in a main chain of the polymer, followed by hydroxylation. The second embodiment differs from the first embodiment in that the second embodiment includes a hydroxylating step, and is the same as in the first embodiment other than this. For this reason, only differences are described below, items not particularly referred are considered to be the same as in the first embodiment, and the description thereof is omitted.

In the second embodiment, regarding the epoxidized polymer before hydroxylating, the content of epoxy groups is not particularly limited, but is preferably from 5 to 25 mol %, and more preferably from 5 to 15 mol %. The content of epoxy groups (the degree of epoxidization) is a ratio of mole number of epoxy groups to mole number of the whole constituting units constituting the epoxidized polymer.

At least a part of epoxy groups in the epoxidized polymer is hydroxylated. A method for hydroxylation is not particularly limited, but it is preferred that hydroxyl groups are formed by reducing epoxy groups.

For example, a part or the whole of epoxy groups in the epoxidized polymer can be reduced by diimide (H—N=N—H) or its derivative in a latex. By reducing in a latex, the hydroxylation can be directly conducted after the epoxidization reaction. Furthermore, by reducing epoxy groups by diimide reduction using diimide or its derivative, a structure in which one hydroxyl group is bonded to a double bond moiety of the main chain (monool structure) is formed, different from a diol structure in the case of water addition to an epoxy group by an acid. In more detail, in the reaction between diimide and an epoxy group, two hydrogen atoms in both terminals of diimide (N—N=N—H) attack an epoxy group, hydrogen addition occurs, and remaining two nitrogen atoms are liberated as nitrogen gas ($N_2$). As a result, for example, monool structures represented by the formulae (10) and (11) are formed. In the monool structure, even though the amount of hydroxyl groups in one molecule is the same as the amount of the diol structure, the number of constituting units having hydroxyl groups is two times that of the diol structure. Therefore, hydroxyl groups can be further uniformly dispersed in a polymer chain.

Diimide precursor that can form diimide at the time of the reaction in a latex is used as a derivative of dimide, and examples thereof include hydrazine hydrate ($H_2NNH_2.H_2O$) and a hydrazide compound. The hydrazine hydrate can form diimide by reacting with oxygen (for example, peroxy acid). The hydrazide compound is a compound having a structure in which hydroxyl group of oxo acid is substituted with hydrazino group (—NH—$NH_2$), and can form diimide by decomposition. Examples of the hydrazide compound include sulfonic acid hydrazides ($RSO_2NHNH_2$ wherein R is preferably an alkyl group or an aryl group, which has from 1 to 12 carbon atoms and may have a substituent) such as p-toluenesulfonyl hydrazide (p-toluenesulfonic acid and diimide are formed by thermal decomposition), triisopropylbenzenesulfonic acid hydrazide, benzenesulfonic acid hydrazide or 3-fluoro-3-oxo-1-propanesulfonic acid hydrazide; carbohydrazides ($RCONHNH_2$ wherein R is preferably an alkyl group or an aryl group, which has from 1 to 12 carbon atoms and may have a substituent) such as acetic acid hydrazide, benzoic acid hydrazide, pentanic acid hydrazide, cyclohexanecarboxylic acid hydrazide or hydrazine carboxylic acid; thio acid hydrazides ($RCSNHNH_2$ wherein R is preferably an alkyl group or an aryl group, which has from 1 to 12 carbon atoms and may have a substituent) such as benzenecarbothio acid hydrazide; hydrazide imides ($R(=NH)NHNH_2$ wherein R is preferably an alkyl group or an aryl group, which has from 1 to 12 carbon atoms and may have a substituent) such as pentanohydrazide imide; and hydrazide hydrazones ($R(=NNH_2)NHNH_2$ wherein R is preferably an alkyl group or an aryl group, which has from 1 to 12 carbon atoms and may have a substituent) such as benzenecarbohydrazonic acid hydrazide. Those diimides and derivatives thereof may be used in one kind alone or as mixtures of two or more kinds.

The method for reducing in a latex using diimide or its derivative is not particularly limited, and for example, epoxy groups of those epoxidized polymers can be reduced by adding diimide or its derivative to a latex of the epoxidized polymer and stirring the resulting mixture while heating.

After hydroxylating as above, the aqueous emulsion is coagulated and dried to obtain a modified diene polymer that is solid at ordinary temperature.

[Third Embodiment]

A method for producing a modified diene polymer according to a third embodiment is that an epoxidized diene polymer having an epoxy group in a main chain thereof is decomposed by oxidative cleavage of carbon-carbon double bond in the main chain, acido-basic properties of the system containing polymer fragments obtained are changed to combine the polymer fragments with each other, and a modified diene polymer having an altered structure is obtained. Thus, the third embodiment uses a diene polymer having an epoxy group introduced therein as a polymer to be subjected to dissociation combining That is, a diene polymer is previously epoxidized, and dissociation combining is then conducted. The basic method is the same as in the first embodiment other than this. For this reason, only differences are described below, items not particularly referred are considered to be the same as in the first embodiment, and the description thereof is omitted.

In the third embodiment, after conducting epoxidization for introducing an epoxy group in a main chain of the diene polymer, dissociation combining is conducted using the epoxidized diene polymer obtained. Commercially available diene polymer previously epoxidized, such as commercially available epoxidized natural rubber, may be used as the epoxidized diene polymer. A method for epoxidization can be conducted using various conventional epoxidization methods the same as above. Preferably, a part of a double bond moiety of a main chain of the diene polymer is epoxidized in a latex, and as one example, epoxidized natural rubber can be obtained by adding a peroxide and an acid to natural rubber latex, followed by conducting the reaction. Thus, by epoxidizing in a latex, it can proceed to dissociation combining of a next step in its state. Of course, after epoxidation, an acid may be neutralized and dissociation combining may be conducted.

By using an epoxidized diene polymer and subjecting carbon-carbon double bond therein to oxidative cleavage, polymer fragments having the structure represented by the formula (5) in a terminal are obtained, similar to the first embodiment. However, in the third embodiment, in the structures represented by the formulae (6) and (7), the diene polymer chain bonded to the group represented by the formula (5) has a structure that an epoxy group is introduced in at least a part of a carbon-carbon double bond moiety.

Next, by changing acido-basic properties of a system containing the polymer fragments obtained and recombining the polymer fragments, a modified diene polymer containing at least one linking group of the formulae (1) to (4) is obtained, similar to the first embodiment. However, since the third embodiment uses a previously epoxidized diene polymer, an epoxy group is already introduced in the diene polymer chain at this stage. In the diene polymer having an epoxy group in a main chain thereof, an epoxy group moiety cleaves in the oxidative cleavage, but the cleaved epoxy group moiety does not recombine even though changing acido-basic properties.

After recombining, an aqueous emulsion is coagulated and dried, and a modified diene polymer that is solid at ordinary temperature is obtained.

[Fourth Embodiment]

A method for producing a modified diene polymer according to a fourth embodiment is a method of using a diene polymer having an epoxy group in a main chain thereof, and includes (a) a step (dissociation combining) of decomposing the diene polymer by oxidative cleavage of a carbon-carbon double bond in the main chain thereof, and changing acido-basic properties of a system containing polymer fragments obtained to combine the polymer fragments with each other, thereby obtaining a polymer having an altered structure, and (b) a step of hydroxylating at least a part of epoxy groups. Thus, the fourth embodiment uses a diene polymer having an epoxy group introduced therein as a polymer to be subjected to dissociation combining, and differs from the third embodiment in that the fourth embodiment contains the step (b) above, and methods other than this are the same as in the third embodiment. For this reason, differences to the third embodiment are described below, items not particularly referred are considered to be the same as in the third embodiment, and the description thereof is omitted.

Any of the steps (a) and (b) may be carried out first. Even in the case where the step (a) is carried out first and even in the case where the step (b) is carried out first, only the order differs, and those steps can be carried out in the same manner.

In the case of conducting the step (a) first, dissociation combining is conducted using an epoxidized diene polymer, and epoxy groups of the polymer obtained are then hydroxylated. The method for hydroxylation is the same as in the second embodiment, and hydroxyl groups can be introduced by reducing at least a part of epoxy groups. Aqueous emulsion is coagulated and dried after hydroxylation, thereby a modified diene polymer that is solid at ordinary temperature is obtained.

[Constitution of Modified Diene Polymer]

<First Modified Diene Polymer>

According to the production methods of the first and third embodiments, a first modified diene polymer in which linking groups represented by the formulae (1) to (4) have been introduced in a main chain thereof and additionally epoxy groups have been introduced in diene polymer chains combined through a linking group is obtained. That is, the modified diene polymer has at least one linking group of the linking groups represented by the formulae (1) to (4) in the molecule, and has a structure that the diene polymer chains containing epoxy groups formed by oxidation of a double bond moiety of a main chain are directly linked through the linking group. Therefore, when any of the linking groups represented by the formulae (1) to (4) is X and a diene polymer chain containing epoxy groups is Y, the modified diene polymer contains a structure represented by —Y—X—Y— in the molecule and generally has a structure that the linking group X and the polymer chain Y are alternately repeated.

The diene polymer chain used herein is a part of molecular chains of the diene polymer to be modified. For example, in the case of a homopolymer of a conjugated diene compound, when a constituting unit comprising the conjugated diene compound is $A^1$, the diene polymer chain is a repeated structure of $A^1$ represented by $-(A^1)_n-$ (n is an integer of 1 or more, and is preferably from 10 to 10,000, and more preferably from 50 to 1,000). In the case of a bipolymer, when each of constituting units is $A^1$ and $A^2$ (at least one of $A^1$ or $A^2$ is a unit comprising a conjugated diene compound, and examples of a unit other than this include a unit comprising the vinyl compound), the diene polymer chain is a repeated structure of $A^1$ and $A^2$ represented by $-(A^1)_n-(A^2)_m-$ (those may be random form or block form, and n and m each are an integer of 1 or more, and are preferably from 10 to 10,000, and more preferably from 50 to 1,000). In the case of a terpolymer, when each of constituting units is $A^1$, $A^2$ and $A^3$ (at least one of $A^1$, $A^2$ or $A^3$ is a unit comprising a conjugated diene compound, and examples of a unit other than this include a unit comprising the vinyl compound), the diene polymer chain is a repeated structure of $A^1$, $A^2$ and $A^3$ represented by $\text{-}(A^1)_n\text{-}(A^2)_m\text{-}(A^3)_p\text{-}$ (those may be random form or block form, and n, m and p each are an integer of 1 or more, and are preferably from 10 to 10,000, and more preferably from 50 to 1,000). Tetrapolymer or more is the same. In the present embodiment, epoxy groups are introduced in at least a part of a constituting unit comprising a conjugated diene compound among the constituting units.

In more detail, in the case of using natural rubber or synthetic isoprene rubber as a polymer to be modified, the diene polymer chain is constituted of an isoprene unit represented by the following formula (8) and an epoxidized isoprene unit represented by the following formula (9).

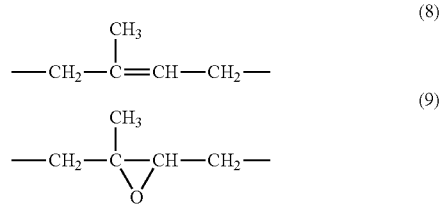

The content of epoxy groups in the first modified diene polymer is not particularly limited, but is preferably from 5 to 25 mol %, and more preferably from 5 to 15 mol %. The content of epoxy groups (degree of epoxidization) used herein is a ratio of mole number of epoxy groups to mole number of the whole constituting units constituting the modified diene polymer. For example, in the case where a polymer to be modified is natural rubber, the content of epoxy groups is a ratio of mole number of epoxidized isoprene units to the total of mole number of the whole isoprene units (including epoxidized isoprene units) and mole number of linking groups in the modified diene polymer.

The glass transition point (Tg) of the first modified diene polymer is not particularly limited, but is preferably from $-60°$ C. to $-40°$ C., and more preferably from $-50°$ C. to $-40°$ C. By having such a glass transition point, when the modified diene polymer is used as a rubber component of a rubber composition for a tire, both rolling resistance performance and wet performance can be increased.

<Second Modified Diene Polymer>

According to the production methods of the second and fourth embodiments, a second modified diene in which the linking groups represented by the formulae (1) to (4) have been introduced in the main chain and additionally hydroxyls groups have been introduced in diene polymer chains combined through the linking group is obtained. That is, the modified diene polymer has at least one linking group of the linking groups represented by the formulae (1) to (4) in the molecule and has a structure that diene polymer chains containing hydroxyl groups directly bonded to a main chain are directly linked through the linking group. Therefore, the modified diene polymer generally contains a structure represented by —Y—X—Y— in the molecule when any of the linking groups represented by the formulae (1) to (4) is X and a diene polymer chain containing hydroxyl groups is Y, and generally has a structure that the linking group X and the polymer chain Y are repeated.

The diene polymer chain may contain epoxy groups formed by oxidation of a double bond moiety in the main chain, together with hydroxyl groups. That is, in the hydroxylation in the above production method, all of epoxy groups contained in the diene polymer chain may be reduced, but a part thereof may be reduced. In this case, the diene polymer chain contains epoxy groups together with hydroxyl groups directed bonded to the main chain.

The case of using natural rubber or synthetic isoprene rubber as a polymer to be modified is described below as one example. In this case, the diene polymer chain may be constituted of an isoprene unit represented by the formula (8) and a hydroxylated isoprene unit. That is, the diene polymer chain has at least one of a constituting unit represented by the following formula (10) or a constituting unit represented by the following formula (11), as the hydroxylated isoprene unit. Generally the constituting unit of the formula (10) is mainly formed by the reduction, but it is considered that there is no practical benefit to distinguish the constituting unit of the formula (10) and the constituting unit of the formula (11). For this reason, the diene polymer chain may have only the constituting unit of the formula (10) as the hydroxylated isoprene unit, may have only the constituting unit of the formula (11) as the hydroxylated isoprene unit, and may have both the constituting unit of the formula (10) and the constituting unit of the formula (11) as the hydroxylated isoprene unit.

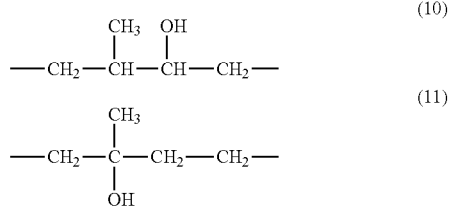

In the case where a part of epoxy groups is reduced as above, the diene polymer chain has an epoxidized isoprene unit represented by the formula (9) together with the isoprene unit of the formula (8) and the constituting units of the formulae (10) and/or (11).

The content of hydroxyl groups in the second modified diene polymer is not particularly limited, but is preferably from 1 to 15 mol %, more preferably from 2 to 15 mol %, and still more preferably from 5 to 10 mol %. The content of hydroxyl groups herein is a ratio of a mole number of constituting units having hydroxyl groups introduced therein to a mole number of the whole constituting units constituting the modified diene polymer. For example, in the case where a polymer to be modified is natural rubber, the content is a ratio of a mole number of hydroxylated isoprene units to the total of a mole number of the whole isoprene units (containing hydroxylated or epoxidized isoprene units) and a mole number of linking groups in the modified diene polymer.

The content of epoxy groups in the second modified diene polymer is not particularly limited, but is preferably 20 mol % or less. The epoxy group is not essential, and may be 0 mol %. The content is more preferably from 1 to 20 mol %, still more preferably from 2 to 15 mol %, and particularly preferably from 5 to 10 mol %. The content of epoxy groups herein is a ratio of a mole number of epoxy groups to a mole number of the whole constituting units constituting the modified diene polymer. For example, in the case where a polymer to be modified is natural rubber, the content is a ratio of a mole number of epoxidized isoprene units to the total of a mole number of the whole isoprene units (containing hydroxylated or epoxidized isoprene units) and a mole number of linking groups in the modified diene polymer.

The glass transition point (Tg) of the second modified diene polymer is not particularly limited, but is preferably from −60° C. to −30° C., and more preferably from −50° C. to −35° C. By having such a glass transition point, when the modified diene polymer is used as a rubber component of a rubber composition for a tire, both rolling resistance performance and wet performance can be increased.

<Content of Linking Group>

In the first and second modified diene polymers, at least one linking group is contained in one molecule of the modified diene polymer, and generally, a plurality of linking groups is contained in one molecule. In the case where a plurality of linking groups is contained, a plurality of any one kind of the linking groups represented by the formulae (1) to (4) may be contained, and two or more kinds of linking groups may be contained. The content of the linking group is not particularly limited, but the total of the linking groups of the formulae (1) to (4) is preferably from 0.001 to 25 mol %, more preferably from 0.1 to 15 mol %, still more preferably from 0.5 to 10 mol %, and particularly preferably from 0.5 to 5 mol %. The content (degree of modification) of linking groups herein is a ratio of a mole number of linking groups to a mole number of the whole constituting units constituting the modified diene polymer. For example, in the case where a polymer to be modified is natural rubber, the content is a ratio of a mole number of linking groups to the total of a mole number of the whole isoprene units (containing epoxidized or hydroxylated isoprene units) and a mole number of linking groups in the modified diene polymer.

The content of each linking group represented by the formulae (1) to (4) is not particularly limited. As one embodiment, it is preferred that the content of each linking group is 25 mol % or less (that is, from 0 to 25 mol %). For example, in the case of natural rubber or synthetic isoprene rubber (that is, in the case where a diene polymer chain has isoprene units), all of the linking groups represented by the formulae (1) to (4) can be generally contained. However, a linking group comprising α,β-unsaturated carbonyl group represented by the formula (1) is mainly contained, and in this case, the content of the linking group represented by the formula (1) is preferably from 0.001 to 20 mol %, more preferably 0.05 to 10 mol %, and still more preferably from 0.5 to 5 mol %.

<Molecular Weight>

It is preferred that the first and second modified diene polymers are solid at ordinary temperature (23° C.). Therefore, the number average molecular weight of the modified diene polymer is preferably from 60,000 or more, more preferably from 60,000 to 1,000,000, still more preferably from 80,000 to 800,000, and still further preferably from 100,000 to 600,000. It is preferred that the molecular weight of the modified diene polymer is set to the same as that of the original polymer by recombination as above. By this, a functional group can be introduced in a main chain of a polymer without decreasing a molecular weight and therefore avoiding adverse influence to properties. Of course, a polymer having a molecular weight smaller than that of the original polymer may be obtained. The weight average molecular weight of the modified diene polymer is not particularly limited, but is preferably 70,000 or more, and more preferably from 100,000 to 1,800,000.

[Action and Effect]

According to the present embodiment, in decomposing a polymer main chain and recombining those, a structure different from a main chain like the above linking group is inserted, and binding point of segments in a main chain structure is functionalized. That is, a structure having high reactivity is introduced in a molecular main chain. Thus, the method of the present embodiment changes a main chain structure itself of a polymer, that is not grafting, direct addition or ring opening, apparently differs from the conventional modification method, and can easily introduce a functional group in a main chain structure. Furthermore, to natural polymer such as natural rubber, a modified polymer having a novel structure can be produced by modifying its main chain structure, and characteristics of a polymer can be changed.

Furthermore, monodispersion is achieved in performing dissociation combining of the diene polymer, and it is possible to converge to further uniform structure. That is, the molecular weight distribution of the modified diene polymer can be made smaller than the molecular weight distribution of the original diene polymer. This is considered that polymer fragments resulting from the decomposition by oxidative cleavage have higher reactively as its size is smaller, and are easily to recombine, and as a result, molecular weight is homogenized by decreasing an amount of short polymers.

According to the present embodiment, a reaction for performing oxidative cleavage can be controlled by adjusting the kind and amount of an oxidizing agent as a chemical for dissociating a double bond, a reaction time and the like. Furthermore, combining reaction can be controlled by adjusting pH, a catalyst, a reaction time and the like in performing recombination. The molecular weight of the modified diene polymer is controlled by controlling those. For this reason, the number average molecular weight of the modified diene polymer can be set to the same as that of the original polymer, and can be set to a number average molecular weight lower than that of the original polymer.

The modified diene polymer according to the present embodiment can be used as a polymer component in various polymer compositions, and although not particularly limited, it is preferably used as a rubber component in various rubber compositions.

[Rubber Composition]

In the rubber composition according to the present embodiment, the rubber component may be the modified diene polymer (sometimes called a modified diene rubber) alone, and may be a blend of the modified diene polymer and other rubber. The other rubber is not particularly limited, and examples thereof include various diene rubbers such as natural rubber (NR), synthetic isoprene rubber (IR), butadiene rubber (BR), styrene-butadiene rubber (SBR), nitrile rubber (NBR), butyl rubber (IIR) and halogenated butyl rubber. Those can be used alone or as mixtures of two or more kinds. The content of the modified diene polymer occupied in the rubber component is not particularly limited, but is preferably 10 parts by mass or more, more preferably 30 parts by mass or more, and still more preferably 50 parts by mass or more, per 100 parts by mass of the rubber component.

In the rubber composition according to the present embodiment, various inorganic fillers such as silica, carbon black, titanium oxide, aluminum silicate, clay or talc can be used as the filler. Those can be used alone or as mixtures of two or more kinds. Of those, silica and/carbon black are preferably used.

The silica is not particularly limited, and examples thereof include wet silica (hydrous silicic acid) and dry silica (anhydrous silicic acid). Above all, wet silica is preferred. Colloidal characteristics of silica are not particularly limited, but silica having nitrogen adsorption specific surface area (BET) by BET method of from 150 to 250 m$^2$/g is preferably used. The BET is more preferably from 180 to 230 m$^2$/g. BET of silica is measured according to BET method described in ISO 5794.

The carbon black is not particularly limited, and furnace carbon black of various grades such as SAF, ISAF, HAF or FEF, used as a reinforcing agent for a rubber can be used.

The amount of the filler added is from 5 to 150 parts by mass, preferably from 20 to 120 parts by mass, and still more preferably from 30 to 100 parts by mass, per 100 parts by mass of the rubber component. In the case of adding silica, the amount of silica added is preferably from 5 to 80 parts by mass, and more preferably from 30 to 80 parts by mass, per 100 parts by mass of the rubber component.

In the rubber composition according to the present embodiment, in the case of adding silica as a filler, a silane coupling agent such as sulfide silane or mercaptosilane may be added in order to further improve dispersibility of silica. The amount of the silane coupling agent added is not particularly limited, but is preferably from 2 to 20 mass % based on the mass of the silica added.

In addition to the components described above, various additives generally used in a rubber composition, such as an oil, zinc flower, stearic acid, an age resister, a wax, a vulcanizing agent or a vulcanization accelerator, can be added to the rubber composition according to the present embodiment.

Examples of the vulcanizing agent include sulfur and a sulfur-containing compound (for example, sulfur chloride, sulfur dichloride, high molecular polysulfide, morpholine disulfide or alkyl phenol disulfide). Those can be used in one kind alone or as mixtures of two or more kinds. The amount of the vulcanizing agent added is not particularly limited, but is preferably from 0.1 to 10 parts by mass, and more preferably from 0.5 to 5 parts by mass, per 100 parts by mass of the rubber component.

Examples of the vulcanization accelerator that can be used include various vulcanization accelerators such as sulfenamide type, thiuram type, thiazole type or guanidine type. Those can be used in one kind alone or as mixtures of two or more kinds. The amount of the vulcanization accelerator added is not particularly limited, but is preferably from 0.1 to 7 parts by mass, and more preferably from 0.5 to 5 parts by mass, per 100 parts by mass of the rubber component.

The rubber composition according to the present embodiment can be prepared by kneading according to the conventional method using a mixing machine generally used such as Banbury mixer, kneader or rolls. That is, a rubber composition can be prepared by adding other additives excluding a vulcanizing agent and a vulcanization accelerator to a rubber component together with a filler, followed by mixing, in a first mixing stage, and then adding a vulcanizing agent and a vulcanization accelerator to the resulting mixture, followed by mixing, in a final mixing stage.

The rubber composition thus obtained can be used in various rubber members for a tire, an antivibration rubber, a conveyor belt or the like. Preferably, the rubber composition can be used for a tire, and can be applied to each site of a tire, such as a tread part, a side wall part, a bead part or a rubber for covering a tire code, of a pneumatic tire of various uses and sizes, such as tires for passenger cars or large-sized tires for truck/bus. That is, the rubber composition is molded into a given shape by, for example, extrusion processing according to the conventional method, and the shaped product is combined with other parts, followed by vulcanization molding at, for example, from 140 to 180° C., whereby a pneumatic tire can be manufactured. Above all, it is particularly preferably used as a formulation for tread of a tire.

The rubber composition according to the present invention brings about the following action and effect. That is, by adding the above-described modified diene rubber, interaction (intermolecular force, polarity or reactivity) between the modified diene polymer and the filler changes and the composition of the polymer changes, whereby compatibility or dispersibility with a filler is improved, and as a result, characteristics of the rubber composition can be improved.

In detail, the modified diene polymer used as a rubber component is that a linking group having functional groups represented by the formulae (1) to (4) is introduced in the main structure. This has the effect of decreasing tan δ in the vicinity of 60° C., and rolling resistance performance can be improved. Furthermore, the introduction of the linking group has the effect of improving tan δ in the vicinity of a glass transition point while suppressing the change of a glass transition point of the original diene polymer.

In the first modified diene polymer, an epoxy group is further introduced in a diene polymer chain of a polymer having a linking group introduced therein, thereby a glass transition point can be shifted to a high temperature side. Therefore, tan δ in the vicinity of 0° C. of lower temperature can be enhanced while maintaining tan δ in the vicinity of 60° C. to be small, and as a result, wet performance can be effectively improved while maintaining rolling resistance performance.

In the second modified diene polymer, an epoxy group is further introduced in a diene polymer chain of a polymer having a linking group introduced therein, thereby a glass transition point can be shifted to a high temperature side. As a result, wet performance can be improved. Furthermore, compatibility with a filler such as silica can be improved by hydroxylating the epoxy groups. Therefore, tan δ in the vicinity of 60° C. is decreased while maintaining wet performance, and rolling resistance performance can be further improved. As a result, rolling resistance performance and wet performance can be more improved.

EXAMPLES

Examples of the present invention are described below, but the present invention is not limited to those examples. Each measurement method is as follow.

[Number Average Molecular Weight (Mn), Weight Average Molecular Weight (Mw) and Molecular Weight Distribution (Mw/Mn)]

Mn, Mw and Mw/Mn in terms of polystyrene were obtained by the measurement with gel permeation chromatography (GPC). In detail, 0.2 mg of a sample dissolved in 1 mL of THF was used as a measurement sample. Using "LC-20DA" manufactured by Shimadzu Corporation, the sample was passed through a filter and then passed through a column ("PL Gel 3 µm Guard×2" manufactured by Polymer Laboratories) at a temperature of 40° C. in a flow rate of 0.7 mL/min, and detected with "RI Detector" manufactured by Spectra System.

[Contents of Linking Group, Epoxy Group and Hydroxyl Group]

Contents of a linking group, an epoxy group and a hydroxyl group were measured by NMR. NMR spectrum was measured by "400 ULTRASHIELD™ PLUS" manufactured by BRUKER with TMS taken as standard. 1 g of a polymer was dissolved in 5 mL of deuterated chloroform, and 87 mg of acetyl acetone chromium salt was added as a relaxation reagent, followed by measurement with NMR 10 mm tube.

Regarding the linking group of the formula (1), a peak of carbon having a ketone group attached thereto is at 195 ppm in $^{13}$C-NMR. Regarding the linking group of the formula (2), a peak of carbon having a ketone group attached thereto is at 205 ppm in $^{13}$C-NMR. Regarding the linking group of the formula (3), a peak of carbon having a ketone group attached thereto is at 200 ppm in $^{13}$C-NMR. Regarding the linking group of the formula (4), a peak of carbon having a ketone group attached thereto is at 185 ppm in $^{13}$C-NMR. Therefore, regarding each peak, the amount of structure (mole number) was determined by a ratio to a base polymer component. Regarding the formula (3), in the case where terminal ketone (structure of the formula (5)) appears, it overlaps a carbon peak (200 ppm) herein. Therefore, the amount of terminal ketone was quantitated by the following method, and removed. That is, a peak of proton attached to a ketone group appears at 9.0 ppm by $^1$H-NMR. Therefore, residual amount was determined by a ratio to a base polymer component.

The mole number of an isoprene unit in a base polymer component was calculated based on peaks of carbon opposite to a methyl group across a double bond and hydrogen (=CH—) bonded thereto, that is, 122 ppm by $^{13}$C-NMR and 5.2 ppm by $^1$H-NMR. Regarding the hydroxyl group, the amount of structure (mole number) was determined based on proton peak 3.4 ppm or from 1.4 to 1.6 ppm of a hydroxyl group bonding portion, and regarding the epoxy group, the amount of structure (mole number) was determined based on proton peak 2.7 ppm of an epoxy group bonding portion. The proton peak herein is a peak of H bonded to carbon opposite to carbon having methyl group bonded thereto. In the case of a hydroxyl group, the proton peak is 3.4 ppm in the formula (10), and the proton peak is from 1.4 to 1.6 ppm in the formula (11). Double bond moiety is sometimes hydrogenated in the reduction. However, regarding the hydrogenated isoprene unit, a peak corresponding to the hydrogenation appears in a proton bonded to carbon neighboring the double bond moiety. Therefore, a ratio of the hydrogenated isoprene unit was obtained from the integrated intensity, and was considered in calculating the whole isoprene unit number.

[pH]

pH was measured using a portable pH meter "HM-30P" manufactured by DKK-Toa Corporation.

[Glass Transition Point]

Glass transition point was measured in a temperature-rising rate of 20° C./min (measurement temperature range: −150° C. to 50° C.) by a differential scanning calorimetry (DSC) according to JIS K7121.

[First Example]

Comparative Example 1

Unmodified Polymer

Unmodified natural rubber (unmodified polymer) was prepared by directly coagulating and drying a natural rubber latex ("HA-NR" manufactured by Regitex Co., Ltd., DRC (Dry Rubber Content)=60 mass %) without modification. Molecular weight of the unmodified polymer was measured. As a result, a weight average molecular weight was 2,020,000, a number average molecular weight was 510,000, a molecular weight distribution was 4.0, and a glass transition point was −62° C.

Comparative 2

Synthesis of Modified Polymer a

The same natural rubber latex as in Comparative Example 1 was used. The natural rubber latex was adjusted to DRC=30 mass %, 1. 65 g of periodic acid ($H_5IO_6$) was added to 100 g of a polymer mass contained in the latex, followed by stirring at 23° C. for 3 hours. By adding periodic acid to a polymer in an emulsion state and then stirring as above, a double bond in a polymer chain oxidatively decomposes, and polymer fragments containing the structure represented by the formula (5) were obtained. The polymer after decomposition had a weight average molecular weight of 13,500, a number average molecular weight of 5,300 and a molecular weight distribution of 2.6, and pH of a reaction liquid after decomposition was 6.2.

Thereafter, 0.1 g of pyrrolidine-2-carboxylic acid was added as a catalyst, 1N sodium hydroxide was added such that pH of the reaction liquid is 8, flowed by stirring at 23° C. for 24 hours to conduct a reaction. The reaction mixture was precipitated in methanol. The precipitate was washed with water, and dried at 30° C. for 24 hours by a hot air circulating drier. Thus, modified polymer a that is solid at ordinary temperature was obtained.

Sodium hydroxide was added to the reaction system thus oxidatively decomposed to forcibly change the reaction system from an acidic system to a basic system, thereby recombination reaction could be preferentially conducted while neutralizing the effect of periodic acid added when conducting oxidative cleavage. As a result, modified natural rubber (modified polymer a) containing linking groups represented by the formulae (1) to (4) in the molecule was obtained. Pyrrolidine-2-carboxylic acid was used as a catalyst, but this was to accelerate a reaction, and the reaction proceeds without the catalyst.

The modified polymer a obtained had a weight average molecular weight Mw of 1,510,000, a number average molecular weight Mn of 490,000, a molecular weight distribution Mw/Mn of 3.1 and a glass transition point of −60° C. as shown in Table 1 below, and the content of the linking groups was 1.0 mol % for the formula (1), 0.3 mol % for the formula (2), 0.2 mol % for the formula (3), and 0.5 mol % for the formula (4), and the total content was 2.0 mol %.

Comparative Example 3

Synthesis of Modified Polymer b

The same natural rubber latex as used in Comparative Example 1 was used. 0.9 g of an emulsifier: sodium dodecyl sulfate (SDS) was added to 100 g of the natural rubber latex adjusted to DRC=30 mass % to stabilize an emulsion state. 8.0 g of 30 mass % hydrogen peroxide solution and 3.05 g of formic acid were added dropwise to the emulsion while stirring at 100 rpm, and reaction was conducted at 50° C. for 24 hours. Thereafter, ethanol was added to the reaction mixture, followed by coagulation and drying. Thus, epoxidized natural rubber (modified polymer b) was obtained. The modified polymer b obtained had a degree of epoxidization of 15 mol % and a glass transition point of −50° C.

Example 1

Synthesis of Modified Polymer A

After conducting oxidative cleavage and recombination reaction in Comparative Example 2, epoxidization reaction was conducted. That is, in Comparative Example 2, 1N sodium hydroxide was added to the reaction liquid such that pH of the reaction liquid is 8, followed by stirring at 23° C. for 24 hours, thereby conducting reaction. The latex obtained was neutralized with formic acid (diluted to a concentration of 10% with water), 8.0 g of 30 mass % hydrogen peroxide solution and 3.05 g of formic acid were added dropwise to the latex, and reaction was conducted at 50° C. for 24 hours. Thereafter, ethanol was added to the reaction mixture, followed by coagulation and drying. Thus, modified epoxidized natural rubber (modified polymer A) that is solid at ordinary temperature was obtained.

The modified polymer A obtained had a weight average molecular weight Mw of 1,470,000, a number average molecular weight Mn of 450,000, and a molecular weight distribution Mw/Mn of 3.3 as shown in Table 1 below, and the content of the linking groups was 1.0 mol % for the formula (1), 0.3 mol % for the formula (2), 0.2 mol % for the formula (3), and 0.5 mol % for the formula (4), and the total content was 2.0 mol %. The content of epoxy groups was 15 mol %, and a glass transition point was −48° C.

Example 2

Synthesis of Modified Polymer B

After conducting the epoxidization reaction in Comparative Example 3, the same oxidative cleavage and recombination reaction as in Comparative Example 2 was conducted. In detail, in Comparative Example 3, after adding hydrogen peroxide solution and formic acid and reacting at 50° C. for 24 hours, a latex of the epoxidized natural rubber obtained was neutralized with 1N sodium hydroxide. 1.65 g of periodic acid ($H_5IO_6$) was added to 100 g of polymer mass contained in the latex, followed by stirring at 23° C. for 3 hours. Double bond in a polymer chain was oxidatively decomposed by this, and polymer fragments containing the structure represented by the formula (5) were obtained. The polymer after decomposition had a weight average molecular weight of 21,300, a number average molecular weight of 11,200 and a molecular weight distribution of 1.9. Furthermore, pH of the reaction liquid after decomposition was 6.0.

Thereafter, 0.1 g of pyrrolidine-2-carboxylic acid was added as a catalyst, 1N sodium hydroxide was added such that pH of the reaction liquid is 8, followed by stirring at 23° C. for 24 hours to conduct reaction. The reaction mixture was precipitated in methanol. The precipitate was washed with water, and dried at 30° C. for 24 hours by a hot air circulating drier. Thus, modified epoxidized natural rubber (modified polymer B) that is solid at ordinary temperature was obtained.

The modified polymer B obtained had a weight average molecular weight Mw of 1,610,000, a number average molecular weight Mn of 430,000, and a molecular weight distribution Mw/Mn of 3.7 as shown in Table 1 below, and the content of the linking groups was 1.0 mol % for the formula (1), and 0.2 mol % for the formula (2), and the total content was 1.2 mol %. The content of epoxy groups was 15 mol %, and a glass transition temperature was −48° C. Furthermore, in the case where epoxidized natural rubber is subjected to dissociation combining, linking groups represented by the formula (3) and the formula (4) were not formed, as shown in Table 1.

Comparative Example 4

Synthesis of Modified Polymer c

Epoxidized natural rubber (modified polymer c) was obtained in the same manner as in Comparative Example 3, except that the amount of 30 mass % hydrogen peroxide solution was changed to 13.3 g and the amount of formic acid was changed to 5.08 g.

Example 3

Synthesis of Modified Polymer C

Modified epoxidized natural rubber (modified polymer C) was obtained in the same manner as in Example 1, except that the amount of 30 mass % hydrogen peroxide solution was changed to 13.3 g and the amount of formic acid was changed to 5.08 g in conducting the epoxidization reaction.

Example 4

Synthesis of Modified Polymer D

Modified epoxidized natural rubber (modified polymer D) was obtained in the same manner as in Example 2, except that the amount of 30 mass % hydrogen peroxide solution was changed to 13.3 g and the amount of formic acid was changed to 5.08 g in conducting the epoxidization reaction.

Comparative Example 5

Synthesis of Modified Polymer d

Epoxidized natural rubber (modified polymer d) was obtained in the same manner as in Comparative Example 3, except that the amount of 30 mass % hydrogen peroxide solution was changed to 2.7 g and the amount of formic acid was changed to 1.02 g.

Example 5

Synthesis of Modified Polymer E

Modified epoxidized natural rubber (modified polymer E) was obtained in the same manner as in Example 1, except that the amount of 30 mass % hydrogen peroxide solution was changed to 2.7 g and the amount of formic acid was changed to 1.02 g in conducting the epoxidization reaction.

Example 6

Synthesis of Modified Polymer F

Modified epoxidized natural rubber (modified polymer F) was obtained in the same manner as in Example 2, except that the amount of 30 mass % hydrogen peroxide solution was changed to 2.7 g and the amount of formic acid was changed to 1.02 g in conducting the epoxidization reaction.

Comparative Example 6

Synthesis of Modified Polymer e

Epoxidized natural rubber (modified polymer e) was obtained in the same manner as in Comparative Example 3, except that the amount of 30 mass % hydrogen peroxide solution was changed to 5.3 g and the amount of formic acid was changed to 2.03 g.

Example 7

Synthesis of Modified Polymer G

Modified epoxidized natural rubber (modified polymer G) was obtained in the same manner as in Example 1, except that the amount of 30 mass % hydrogen peroxide solution was changed to 5.3 g and the amount of formic acid was changed to 2.03 g in conducting the epoxidization reaction.

Example 8

Synthesis of Modified Polymer H

Modified epoxidized natural rubber (modified polymer H) was obtained in the same manner as in Example 2, except that the amount of 30 mass % hydrogen peroxide solution was changed to 5.3 g and the amount of formic acid was changed to 2.03 g in conducting the epoxidization reaction.

The molecular weight, the contents of linking groups and epoxy groups and the glass transition point of the modified polymers C to H and c to e obtained above are shown in Table 1 below.

TABLE 1

| | Before oxidative decomposition | | | Oxidative decomposition condition | | | After decomposition | | | | Recombination condition | | | | |
|---|---|---|---|---|---|---|---|---|---|---|---|---|---|---|---|
| | Mw ($\times 10^5$) | Mn ($\times 10^5$) | Mw/Mn | Temp. (° C.) | Periodic acid amount (g) | Reaction time (h) | Mw ($\times 10^3$) | Mw ($\times 10^3$) | Mw/Mn | pH | Temp. (° C.) | Pyrrolidine-2-carboxylic acid amount (g) | pH regulator | Reaction time (h) | pH |
| Comparative Example 1: Unmodified polymer | — | — | — | — | — | — | — | — | — | — | — | — | — | — | — |
| Comparative Example 2: Modified polymer a | 20.2 | 5.1 | 4.0 | 23 | 1.65 | 3 | 13.5 | 5.3 | 2.6 | 6.2 | 23 | 0.1 | NaOH | 24 | 8.0 |
| Comparative Example 3: Modified polymer b | — | — | — | — | — | — | — | — | — | — | — | — | — | — | — |
| Example 1: Modified polymer A | 20.2 | 5.1 | 4.0 | 23 | 1.65 | 3 | 13.5 | 5.3 | 2.6 | 6.2 | 23 | 0.1 | NaOH | 24 | 8.0 |
| Example 2: Modified polymer B | 18.6 | 4.2 | 4.3 | 23 | 1.65 | 3 | 21.3 | 11.2 | 1.9 | 6.0 | 23 | 0.1 | NaOH | 24 | 8.0 |
| Comparative Example 4: Modified polymer c | — | — | — | — | — | — | — | — | — | — | — | — | — | — | — |
| Example 3: Modified polymer C | 20.2 | 5.1 | 4.0 | 23 | 1.65 | 3 | 13.5 | 5.3 | 2.6 | 6.2 | 23 | 0.1 | NaOH | 24 | 8.0 |
| Example 4: Modified polymer D | 17.1 | 4.3 | 4.0 | 23 | 1.65 | 3 | 24.1 | 13.1 | 1.8 | 6.0 | 23 | 0.1 | NaOH | 24 | 8.0 |
| Comparative Example 5: Modified polymer d | — | — | — | — | — | — | — | — | — | — | — | — | — | — | — |
| Example 5: Modified polymer E | 20.2 | 5.1 | 4.0 | 23 | 1.65 | 3 | 13.5 | 5.3 | 2.6 | 6.2 | 23 | 0.1 | NaOH | 24 | 8.0 |
| Example 6: Modified polymer F | 19.2 | 4.7 | 4.1 | 23 | 1.65 | 3 | 14.2 | 6.4 | 2.2 | 6.0 | 23 | 0.1 | NaOH | 24 | 8.0 |
| Comparative Example 6: Modified polymer e | — | — | — | — | — | — | — | — | — | — | — | — | — | — | — |
| Example 7: Modified polymer G | 20.2 | 5.1 | 4.0 | 23 | 1.65 | 3 | 13.5 | 5.3 | 2.6 | 6.2 | 23 | 0.1 | NaOH | 24 | 8.0 |
| Example 8: Modified polymer H | 19.6 | 4.8 | 4.1 | 23 | 1.65 | 3 | 19.1 | 8.2 | 2.3 | 6.0 | 23 | 0.1 | NaOH | 24 | 8.0 |

| | Constitution of polymer formed | | | | | | | | |
|---|---|---|---|---|---|---|---|---|---|
| | Mw ($\times 10^5$) | Mn ($\times 10^5$) | Mw/Mn | Content of linking group (mol %) | | | | | Epoxy group content (mol %) | Glass transition point (° C.) |
| | | | | Formula (1) | Formula (2) | Formula (3) | Formula (4) | Total | | |
| Comparative Example 1: Unmodified polymer | 20.2 | 5.1 | 4.0 | 0 | 0 | 0 | 0 | 0 | 0 | −62 |
| Comparative Example 2: Modified polymer a | 15.1 | 4.9 | 3.1 | 1.0 | 0.3 | 0.2 | 0.5 | 0.2 | 0 | −60 |
| Comparative Example 3: Modified polymer b | 18.6 | 4.2 | 4.3 | 0 | 0 | 0 | 0 | 0 | 15 | −50 |

TABLE 1-continued

| | | | | | | | | | | |
|---|---|---|---|---|---|---|---|---|---|---|
| Example 1: Modified polymer A | 14.7 | 4.5 | 3.3 | 1.0 | 0.3 | 0.2 | 0.5 | 2.0 | 15 | −48 |
| Example 2: Modified polymer B | 16.1 | 4.3 | 3.7 | 1.0 | 0.2 | 0.0 | 0.0 | 1.2 | 15 | −48 |
| Comparative Example 4: Modified polymer c | 17.1 | 4.3 | 4.0 | 0 | 0 | 0 | 0 | 0 | 25 | −42 |
| Example 3: Modified polymer C | 14.3 | 4.4 | 3.3 | 1.0 | 0.3 | 0.2 | 0.5 | 2.0 | 25 | −40 |
| Example 4: Modified polymer D | 16.4 | 4.1 | 4.0 | 1.1 | 0.2 | 0.0 | 0.0 | 1.3 | 25 | −40 |
| Comparative Example 5: Modified polymer d | 19.2 | 4.7 | 4.1 | 0 | 0 | 0 | 0 | 0 | 5 | −58 |
| Example 5: Modified polymer E | 15.0 | 4.7 | 3.2 | 1.0 | 0.3 | 0.2 | 0.5 | 2.0 | 5 | −56 |
| Example 6: Modified polymer F | 15.4 | 4.9 | 3.1 | 1.0 | 0.1 | 0.0 | 0.0 | 1.1 | 5 | −56 |
| Comparative Example 6: Modified polymer e | 19.6 | 4.8 | 4.1 | 0 | 0 | 0 | 0 | 0 | 10 | −54 |
| Example 7: Modified polymer G | 14.9 | 4.7 | 3.2 | 1.0 | 0.3 | 0.2 | 0.5 | 2.0 | 10 | −52 |
| Example 8: Modified polymer H | 15.9 | 4.7 | 3.4 | 1.0 | 0.2 | 0.0 | 0.0 | 1.2 | 10 | −52 |

As shown in Table 1, in the modified polymer a obtained by dissociation combining of an unmodified polymer, a linking group having a functional group is introduced therein, but the change of a glass transition point was slight. Furthermore, the molecular weight distribution of the modified polymer a was small as compared with that of the unmodified polymer. In the modified polymers A to H according to the examples, the glass transition point is high by introducing an epoxy group in the modified polymer a, and the glass transition point was increased as the amount of epoxy group introduced is increased.

<Reference Example>

Natural rubber latex ("LA-NR" manufactured by Regitex Co., Ltd., Mw=1,510,000, Mn=269,000, Mw/Mn=5.6) was used as a polymer to be modified. 1.1 g of periodic acid ($H_5IO_6$) was added to 100 g of a polymer mass in the natural rubber latex adjusted to DRC=30 mass %, followed by stirring at 23° C. for 6 hours, thereby oxidatively decomposing a double bond in a polymer chain. The decomposed polymer obtained had Mw=10,000, Mn=3,000 and Mw/Mn=3.4, and pH of a reaction liquid after decomposition was 8.0. Thereafter, 0.1 g of pyrrolidine-2-carboxylic acid was added as a catalyst, 1N hydrochloric acid was added to the reaction liquid such that pH of the reaction liquid is 6.8, and the reaction liquid was stirred at 23° C. for 12 hours to conduct the reaction. The reaction mixture was reprecipitaed in methanol, and the precipitate was washed with water and dried at 30° C. for 24 hours by a hot air circulating dryer. Thus, a modified polymer that is solid at ordinary temperature was obtained. The modified polymer obtained had Mw=540,000, Mn=142,000 and Mw/Mn=3.8, the content of the linking group was 0.61 mol % for the formula (1) and 0.06 mol % for the formula (2), and the total was 0.67 mol %. Thus, the dissociation combining reaction of the polymer can be conducted in the case where the system after dissociation is basic and the system is changed into an acidic system. As a result, it can be easily understood that the modified epoxidized natural rubber according to the embodiment is obtained by epoxidizing the polymer after combining reaction even in this case.

Example 9 to 16 and Comparative Examples 7 to 12

Rubber Composition

Banbury mixer was used. According to the formulation (parts by mass) shown in Table 2 below, compounding ingredients excluding sulfur and a vulcanization accelerator were added to a rubber component, followed by kneading, in a first mixing stage, and sulfur and a vulcanization accelerator were then added to the kneaded material, followed by kneading, in a final mixing stage. Thus, a rubber composition was prepared. The detail of each component in Table 2, excluding a rubber component, is as follows.

Silica: "NIPSIL AQ" manufactured by Tosoh Silica Corporation

Carbon black: "SEAST 3" manufactured by Tokai Carbon Co., Ltd.

Silane coupling agent: Bis-(3-trimethoxysilylpropyl)tetrasulfide, "Si69" manufactured by EVONIK DEGUSSA Zinc flower: "Zinc Flower Grade 1" manufactured by Mitsui Mining & Smelting Co., Ltd.

Process oil: "X-140" manufactured by JX Nippon Oil & Energy Corporation

Age resister: "NOCRAC 6C" manufactured by Ouchi Shinko Chemical Industrial Co., Ltd.

Stearic acid: "LUNAC S-20" manufactured by Kao Corporation

Sulfur: "Powdered sulfur for rubber 150 mesh" manufactured by Hosoi Chemical Industry Co., Ltd.

Vulcanization accelerator: "NOCCELER CZ" manufactured by Ouchi Shinko Chemical Industrial Co., Ltd.

Each rubber composition obtained was vulcanized at 160° C. for 20 minutes to prepare a test piece having a given shape, a dynamic viscoelasticity test was conducted using the test piece obtained, and wet skid performance (tan δ (0° C.)) and rolling resistance performance (tan δ (60° C.)) were evaluated. Additionally, a tensile test was conducted, and modulus of elasticity M300 and tensile strength were evaluated. Each evaluation method is as follows.

Wet skid performance (tan δ (0° C.)): Loss factor tan δ was measured under the conditions of frequency: 50 Hz, static strain: 10%, dynamic strain: 2% and temperature: 0° C. using rheospectrometer E4000 manufactured by USM, and indicated by an index with the value of Comparative Example 7 taken as 100. The tan δ at 0° C. is generally used as an index of grip performance (wet skid performance) to a wet road surface in a rubber composition for a tire, and as the index is larger, the tan δ is larger, indicating that wet skid performance is more excellent.

Rolling resistance performance (tan δ (60° C.)): tan δ was measured in the same manner as in tan δ (0° C.), except for changing the temperature to 60° C. The inverse number of tan δ was indicated by an index with the value of Comparative Example 7 taken as 100. The tan δ at 60° C. is generally used as an index of low heat generation in a rubber composition for a tire. As the index is larger, the tan δ is smaller, and therefore, more difficult to generate heat, and this indicates that rolling resistance performance (low fuel consumption performance) as a tire is more excellent.

Modulus of elasticity M300: 300% modulus was measured by conducting a tensile test (dumbbell shape No. 3) according to JIS K6251, and indicated by an index when the value of Comparative Example 7 is taken as 100. M300 is larger and rigidity is higher as the index is larger.

Tensile strength: Strength at break was measured by conducting a tensile test (dumbbell shape No. 3) according to JIS K6251, and indicated by an index when the value of Comparative Example 7 is taken as 100. Tensile strength is higher, which is better, as the index is larger.

compared with Comparative Example 7 using unmodified natural rubber. Furthermore, in Examples 9 to 16, wet skid performance was improved due to high Tg of a polymer while suppressing decrease of rolling resistance performance, as compared with Comparative Example 8, and the effect of achieving both rolling resistance performance and wet performance was excellent. Furthermore, in Examples 9 to 16, modulus of elasticity and tensile strength are high and reinforcing property is excellent. As a result, reinforcing property, wet skid property and rolling resistance performance could be achieved together in high level.

[Second Example]

Comparative Example 13

Synthesis of Modified Polymer f 300 g of water was added to 100 g of the latex before coagulating the modified polymer e obtained in Comparative

TABLE 2

| | Com. Ex. 7 | Com. Ex. 8 | Com. Ex. 9 | Ex. 9 | Com. Ex. 10 | Ex. 10 | Ex. 11 | Ex. 12 | Com. Ex. 11 | Ex. 13 | Ex. 14 | Com. Ex. 12 | Ex. 15 | Ex. 16 |
|---|---|---|---|---|---|---|---|---|---|---|---|---|---|---|
| Formulation (parts by mass) | | | | | | | | | | | | | | |
| Unmodified polymer (Com. Ex. 1) | 100 | | | | | | | | | | | | | |
| Modified polymer a (Comp. Ex. 2) | | 100 | | | | | | | | | | | | |
| Modified polymer b (Com. Ex. 3) | | | 100 | | | | | | | | | | | |
| Modified polymer A (Example 1) | | | | 100 | | | | | | | | | | |
| Modified polymer B (Example 2) | | | | | 100 | | | | | | | | | |
| Modified polymer c (Com. Ex. 4) | | | | | | 100 | | | | | | | | |
| Modified polymer C (Example 3) | | | | | | | 100 | | | | | | | |
| Modified polymer D (Example 4) | | | | | | | | 100 | | | | | | |
| Modified polymer d (Com. Ex. 5) | | | | | | | | | 100 | | | | | |
| Modified polymer E (Example 5) | | | | | | | | | | 100 | | | | |
| Modified polymer F (Example 6) | | | | | | | | | | | 100 | | | |
| Modified polymer e (Com. Ex. 6) | | | | | | | | | | | | 100 | | |
| Modified polymer G (Example 7) | | | | | | | | | | | | | 100 | |
| Modified polymer H (Example 8) | | | | | | | | | | | | | | 100 |
| Silica | 50 | 50 | 50 | 50 | 50 | 50 | 50 | 50 | 50 | 50 | 50 | 50 | 50 | 50 |
| Carbon black | 10 | 10 | 10 | 10 | 10 | 10 | 10 | 10 | 10 | 10 | 10 | 10 | 10 | 10 |
| Silane coupling agent | 4 | 4 | 4 | 4 | 4 | 4 | 4 | 4 | 4 | 4 | 4 | 4 | 4 | 4 |
| Zinc flower | 2 | 2 | 2 | 2 | 2 | 2 | 2 | 2 | 2 | 2 | 2 | 2 | 2 | 2 |
| Process oil | 2 | 2 | 2 | 2 | 2 | 2 | 2 | 2 | 2 | 2 | 2 | 2 | 2 | 2 |
| Age resister | 2 | 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 | 1.5 | 1.5 | 1.5 | 1.5 | 1.5 | 1.5 |
| Properties (Index) | | | | | | | | | | | | | | |
| Rolling resistance performance | 100 | 142 | 94 | 146 | 139 | 88 | 139 | 134 | 97 | 143 | 142 | 95 | 145 | 131 |
| Wet skid performance | 100 | 120 | 128 | 141 | 139 | 170 | 194 | 191 | 107 | 126 | 124 | 114 | 141 | 139 |
| Modulus of elasticity | 100 | 103 | 102 | 105 | 107 | 105 | 104 | 104 | 101 | 103 | 105 | 102 | 103 | 106 |
| Tensile strength | 100 | 105 | 103 | 113 | 111 | 104 | 115 | 112 | 101 | 106 | 105 | 103 | 111 | 110 |

The results are shown in Table 2. In Comparative Example 8, since modified natural rubber (modified polymer a) having linking groups represented by the formulae (1) to (4) obtained by dissociation combining of natural rubber was used, rolling resistance performance was excellent and wet skid performance was improved, as compared with Comparative Example 7 using unmodified natural rubber. On the other hand, in Comparative Examples 9 to 12 using epoxidized natural rubbers (modified rubbers b, c, d and e), wet skid performance was improved but rolling resistance performance was poor, as compared with Comparative Example 7. Contrary to this, in Examples 9 to 16 using modified epoxidized natural rubbers (modified polymers A to H) obtained by dissociation combining of natural rubber and further epoxidization, rolling resistance performance and wet skid performance were remarkably improved as Example 6 to adjust DRC to 7.5 mass %, and while stirring at 100 rpm, 4.1 g of p-toluenesulfonyl hydrazide was added, a reaction was conducted at 80° C. for 24 hours. Thereafter, ethanol was added, and coagulation and drying were conducted. Thus, a hydroxylated epoxidized natural rubber (modified polymer f) was obtained.

Example 17

Synthesis of Modified Polymer I

The same rubber latex as used in Comparative Example 1 was used. The natural rubber latex was adjusted to DRC=30 mass %, and 1.65 g of periodic acid ($H_2IO_6$) was added to 100 g of a polymer mass contained in the latex, followed by stirring at 23° C. for 3 hours. By adding periodic acid to the polymer in an emulsion state as above and stirring the mixture, a double bond in a polymer chain was oxidatively decomposed and polymer fragments containing the structure represented by the formula (5) above were obtained. The polymer after decomposition had a weight average molecular weight of 13,500, a number average molecular weight of 5,300 and a molecular weight distribution of 2.6, and pH of a reaction liquid after decomposition was 6.2.

Thereafter, 0.1 g of pyrrolidine-2-carboxylic acid was added as a catalyst, 1N sodium hydroxide was added such that pH of the reaction liquid is 8, followed by stirring at 23° C. for 24 hours to conduct a reaction. Thus, by changing the reaction system from an acidic system to a basic system, a recombination reaction could be preferentially conducted while neutralizing the effect of periodic acid added in the oxidative cleavage. After conducting the recombination reaction, the latex obtained was neutralized with formic acid (diluted to 10% concentration with water), 5.3 g of 30 mass % hydrogen peroxide solution and 2.03 g of formic acid were added dropwise, and a reaction was conducted at 50° C. for 24 hours to perform epoxidization.

Thereafter, 300 g of water was added to 100 g of the latex obtained to adjust DRC to 7.5 mass %, and while stirring at 100 rpm, 4.1 g of p-toluenesulfonyl hydrizide was added and a reaction was conducted at 80° C. for 24 hours. Thereafter, the reaction mixture was precipitated in methanol, and the precipitate was washed with water and then dried by a hot air circulating drier at 30° C. for 24 hours. Thus, modified hydroxylated epoxidized natural rubber (modified polymer I) that is solid at ordinary temperature was obtained.

The modified polymer I obtained had a weight average molecular weight Mw of 1,480,000, a number average molecular weight Mn of 490,000 and a molecular weight distribution Mw/Mn of 3.0 as shown in Table 3 below. The content of the linking group was 1.0 mol % for the formula (1), 0.3 mol % for the formula (2), 0.2 mol % for the formula (3) and 0.5 mol % for the formula (4), and the total was 2.0 mol %. Furthermore, the content of the epoxy groups was 5 mol %, the content of the hydroxyl groups was 5 mol %, and the glass transition point was −50° C.

Example 18

Synthesis of Modified Polymer J

After conducting the epoxidization reaction in Comparative Example 6, oxidative cleavage and recombination reaction were conducted in the same manner as in Example 17, and the epoxy group was then reduced to hydroxylate. In detail, after adding hydrogen peroxide solution and formic acid and conducting a reaction at 50° C. for 24 hours in Comparative Example 6, a latex of the epoxidized natural rubber obtained was neutralized with 1N sodium hydroxide, and 1.65 g of periodic acid ($H_2IO_6$) was added to 100 g of a polymer mass contained in the latex, followed by stirring at 23° C. for 3 hours. By this, a double bond in a polymer chain was oxidatively decomposed and polymer fragments containing the structure represented by the formula (5) above were obtained. The polymer after decomposition had a weight average molecular weight of 19,100, a number average molecular weight of 8,200 and a molecular weight distribution of 2.3, and pH of a reaction liquid after decomposition was 6.0.

Thereafter, 0.1 g of pyrrolidine-2-carboxylic acid was added as a catalyst, 1N sodium hydroxide was added such that pH of the reaction liquid is 8, followed by stirring at 23° C. for 24 hours to conduct a reaction, thereby a recombination reaction was conducted. Thereafter, neutralization was conducted with formic acid (diluted to 10% concentration with water), 300 g of water was added to 100 g of the latex obtained to adjust DRC to 7.5 mass %, and while stirring at 100 rpm, 4.1 g of p-toluenesulfonyl hydrizide was added to conduct a reaction at 80° C. for 24 hours. Thereafter, the reaction mixture was precipitated in methanol, and the precipitate obtained was washed with water and dried by a hot air circulating drier at 30° C. for 24 hours. Thus, modified hydroxylated epoxidized natural rubber (modified polymer J) that is solid at ordinary temperature was obtained.

As shown in Table 3 below, the modified polymer J obtained had a weight average molecular weight Mw of 1,610,000, a number average molecular weight Mn of 390,000 and a molecular weight distribution of 4.1. The content of the linking group was 1.0 mol % for the formula (1) and 0.2 mol % for the formula (2), and the total was 1.2 mol %. Furthermore, the content of the epoxy groups was 5 mol %, the content of the hydroxyl groups was 5 mol %, and the glass transition point was −50° C. As shown in Table 3, in the case where the epoxidized natural rubber is subjected to dissociation combining, the linking groups represented by the formula (3) and the formula (4) were not formed.

Comparative Example 17

Synthesis of Modified Polymer j

Epoxidized natural rubber (modified polymer j) was obtained in the same manner as in Comparative Example 6, except that the amounts of hydrogen peroxide solution and formic acid in the epoxidization reaction were changed to the amounts shown in Table 3.

Comparative Examples 14 to 16, 18 and 19

Synthesis of Modified Polymers g, h, i, k and m

Hydroxylated epoxidized natural rubbers (modified polymers g, h, i, k and m) were obtained in the same manner as in Comparative Example 13, except that the amounts of hydrogen peroxide solution and formic acid in the epoxidization reaction and the amount of p-toluenesulfonyl hydrazide in the hydroxylation reaction were changed to the amounts shown in Table 3.

Examples 19, 21, 23, 25 and 27

Synthesis of Modified Polymers K, M, O, Q and S

Modified natural rubbers (modified polymers K, M, O, Q and S) were obtained in the same manner as in Example 17, except that the amounts of hydrogen peroxide solution and formic acid in the epoxidization reaction and the amount of p-toluenesulfonyl hydrazide in the hydroxylation reaction were changed to the amounts shown in Table 3.

Examples 20, 22, 24, 26 and 28

Synthesis of Modified Polymers L, N, P, R and T

Modified natural rubbers (modified polymers L, N, P, R and T) were obtained in the same manner as in Example 18, except that the amounts of hydrogen peroxide solution and formic acid in the epoxidization reaction and the amount of p-toluenesulfonyl hydrazide in the hydroxylation reaction were changed to the amounts shown in Table 3.

TABLE 3

| | Before oxidative decomposition | | | Oxidative decomposition condition | | | After decomposition | | | |
|---|---|---|---|---|---|---|---|---|---|---|
| | | | | | Periodic acid | Reaction | | | | |
| | Mw (×10⁵) | Mn (×10⁵) | Mw/Mn | Temp. (° C.) | amount (g) | time (h) | Mw (×10³) | Mw (×10³) | Mw/Mn | pH |
| Comparative Example 1: Unmodified polymer | — | — | — | — | — | — | — | — | — | — |
| Comparative Example 6: Modified polymer e | — | — | — | — | — | — | — | — | — | — |
| Comparative Example 13: Modified polymer f | — | — | — | — | — | — | — | — | — | — |
| Example 17: Modified polymer I | 20.2 | 5.1 | 4.0 | 23 | 1.65 | 3 | 13.5 | 5.3 | 2.6 | 6.2 |
| Example 18: Modified polymer J | 19.6 | 4.8 | 4.1 | 23 | 1.65 | 3 | 19.1 | 8.2 | 2.3 | 6.0 |
| Comparative Example 3: Modified polymer b | — | — | — | — | — | — | — | — | — | — |
| Comparative Example 14: Modified polymer g | — | — | — | — | — | — | — | — | — | — |
| Comparative Example 15: Modified polymer h | — | — | — | — | — | — | — | — | — | — |
| Example 19: Modified polymer K | 20.2 | 5.1 | 4.0 | 23 | 1.65 | 3 | 13.5 | 5.3 | 2.6 | 6.2 |
| Example 20: Modified polymer L | 18.6 | 4.2 | 4.3 | 23 | 1.65 | 3 | 21.3 | 11.2 | 1.9 | 6.0 |
| Example 21: Modified polymer M | 20.2 | 5.1 | 4.0 | 23 | 1.65 | 3 | 13.5 | 5.3 | 2.6 | 6.2 |
| Example 22: Modified polymer N | 18.6 | 4.2 | 4.3 | 23 | 1.65 | 3 | 21.3 | 11.2 | 1.9 | 6.0 |
| Comparative Example 5: Modified polymer d | — | — | — | — | — | — | — | — | — | — |
| Comparative Example 16: Modified polymer i | — | — | — | — | — | — | — | — | — | — |
| Example 23: Modified polymer O | 20.2 | 5.1 | 4.0 | 23 | 1.65 | 3 | 13.5 | 5.3 | 2.6 | 6.2 |
| Example 24: Modified polymer P | 19.2 | 4.7 | 4.1 | 23 | 1.65 | 3 | 14.2 | 6.4 | 2.2 | 6.0 |
| Comparative Example 17: Modified polymer j | — | — | — | — | — | — | — | — | — | — |
| Comparative Example 18: Modified polymer k | — | — | — | — | — | — | — | — | — | — |
| Example 25: Modified polymer Q | 20.2 | 5.1 | 4.0 | 23 | 1.65 | 3 | 13.5 | 5.3 | 2.6 | 6.2 |
| Example 26: Modified polymer R | 16.1 | 4.3 | 3.7 | 23 | 1.65 | 3 | 27.8 | 17.4 | 1.6 | 6.0 |
| Comparative Example 4: Modified polymer c | — | — | — | — | — | — | — | — | — | — |
| Comparative Example 19: Modified polymer m | — | — | — | — | — | — | — | — | — | — |
| Example 27: Modified polymer S | 20.2 | 5.1 | 4.0 | 23 | 1.65 | 3 | 13.5 | 5.3 | 2.6 | 6.2 |
| Example 28: Modified polymer T | 17.1 | 4.3 | 4.0 | 23 | 1.65 | 3 | 24.1 | 13.1 | 1.8 | 6.0 |
| Comparative Example 2: Modified polymer a | 20.2 | 5.1 | 4.0 | 23 | 1.65 | 3 | 13.5 | 5.3 | 2.6 | 6.2 |

| | Recombination condition | | | | | Epoxidization | | |
|---|---|---|---|---|---|---|---|---|
| | Temp. (° C.) | Pyrridine-2-carboxylic acid amount (g) | pH regulator | Reaction time (h) | pH | Hydrogen peroxide solution amount (g) | Formic acid amount (g) | Hydroxylation p-Toluenesulfonyl hydrazide amount (g) |
| Comparative Example 1: Unmodified polymer | — | — | — | — | — | — | — | — |
| Comparative Example 6: Modified polymer e | — | — | — | — | — | 5.3 | 2.03 | — |
| Comparative Example 13: Modified polymer f | — | — | — | — | — | 5.3 | 2.03 | 4.1 |
| Example 17: Modified polymer I | 23 | 0.1 | NaOH | 24 | 8.0 | 5.3 | 2.03 | 4.1 |
| Example 18: Modified polymer J | 23 | 0.1 | NaOH | 24 | 8.0 | 5.3 | 2.03 | 4.1 |
| Comparative Example 3: Modified polymer b | — | — | — | — | — | 8.0 | 3.05 | — |
| Comparative Example 14: Modified polymer g | — | — | — | — | — | 8.0 | 3.05 | 4.1 |
| Comparative Example 15: Modified polymer h | — | — | — | — | — | 8.0 | 3.05 | 7.8 |
| Example 19: Modified polymer K | 23 | 0.1 | NaOH | 24 | 8.0 | 8.0 | 3.05 | 4.1 |
| Example 20: Modified polymer L | 23 | 0.1 | NaOH | 24 | 8.0 | 8.0 | 3.05 | 4.1 |
| Example 21: Modified polymer M | 23 | 0.1 | NaOH | 24 | 8.0 | 8.0 | 3.05 | 7.8 |
| Example 22: Modified polymer N | 23 | 0.1 | NaOH | 24 | 8.0 | 8.0 | 3.05 | 7.8 |
| Comparative Example 5: Modified polymer d | — | — | — | — | — | 2.7 | 1.02 | — |
| Comparative Example 16: Modified polymer i | — | — | — | — | — | 2.7 | 1.02 | 4.1 |
| Example 23: Modified polymer O | 23 | 0.1 | NaOH | 24 | 8.0 | 2.7 | 1.02 | 4.1 |
| Example 24: Modified polymer P | 23 | 0.1 | NaOH | 24 | 8.0 | 2.7 | 1.02 | 4.1 |
| Comparative Example 17: Modified polymer j | — | — | — | — | — | 10.6 | 4.06 | — |
| Comparative Example 18: Modified polymer k | — | — | — | — | — | 10.6 | 4.06 | 7.8 |
| Example 25: Modified polymer Q | 23 | 0.1 | NaOH | 24 | 8.0 | 10.6 | 4.06 | 7.8 |
| Example 26: Modified polymer R | 23 | 0.1 | NaOH | 24 | 8.0 | 10.6 | 4.06 | 7.8 |
| Comparative Example 4: Modified polymer c | — | — | — | — | — | 13.3 | 5.08 | — |
| Comparative Example 19: Modified polymer m | — | — | — | — | — | 13.3 | 5.08 | 7.8 |
| Example 27: Modified polymer S | 23 | 0.1 | NaOH | 24 | 8.0 | 13.3 | 5.08 | 7.8 |
| Example 28: Modified polymer T | 23 | 0.1 | NaOH | 24 | 8.0 | 13.3 | 5.08 | 7.8 |
| Comparative Example 2: Modified polymer a | 23 | 0.1 | NaOH | 24 | 8.0 | — | — | — |

| | Constitution of polymer formed | | | | | | | | |
|---|---|---|---|---|---|---|---|---|---|
| | | | | Linking group content (mol %) | | | | Epoxy group content (mol %) | Hydroxyl group content (mol %) | Glass transition point (° C.) |
| | Mw (×10⁵) | Mn (×10⁵) | Mw/Mn | Formula (1) | Formula (2) | Formula (3) | Formula (4) | Total | | | |
| Comparative Example 1: Unmodified polymer | 20.2 | 5.1 | 4.0 | 0 | 0 | 0 | 0 | 0 | 0 | 0 | −62 |
| Comparative Example 6: Modified polymer e | 19.6 | 4.8 | 4.1 | 0 | 0 | 0 | 0 | 0 | 10 | 0 | −54 |
| Comparative Example 13: Modified polymer f | 18.1 | 4.9 | 3.7 | 0 | 0 | 0 | 0 | 0 | 5.0 | 5.0 | −52 |

TABLE 3-continued

| | | | | | | | | | | | |
|---|---|---|---|---|---|---|---|---|---|---|---|
| Example 17: Modified polymer I | 14.8 | 4.9 | 3.0 | 1.0 | 0.3 | 0.2 | 0.5 | 2.0 | 5.0 | 5.0 | −50 |
| Example 18: Modified polymer J | 16.1 | 3.9 | 4.1 | 1.0 | 0.2 | 0.0 | 0.0 | 1.2 | 5.0 | 5.0 | −50 |
| Comparative Example 3: Modified polymer b | 18.6 | 4.2 | 4.3 | 0 | 0 | 0 | 0 | 0 | 15 | 0 | −50 |
| Comparative Example 14: Modified polymer g | 17.6 | 4.0 | 4.4 | 0 | 0 | 0 | 0 | 0 | 10 | 5.0 | −48 |
| Comparative Example 15: Modified polymer h | 17.1 | 4.0 | 4.3 | 0 | 0 | 0 | 0 | 0 | 5.0 | 10 | −45 |
| Example 19: Modified polymer K | 14.6 | 4.6 | 3.2 | 1.0 | 0.3 | 0.2 | 0.5 | 2.0 | 10 | 5.0 | −46 |
| Example 20: Modified polymer L | 16.4 | 4.1 | 4.0 | 1.1 | 0.2 | 0.0 | 0.0 | 1.3 | 10 | 5.0 | −46 |
| Example 21: Modified polymer M | 14.4 | 4.8 | 3.0 | 1.0 | 0.3 | 0.2 | 0.5 | 2.0 | 5.0 | 10 | −43 |
| Example 22: Modified polymer N | 16.2 | 4.0 | 4.1 | 1.0 | 0.2 | 0.0 | 0.0 | 1.2 | 5.0 | 10 | −43 |
| Comparative Example 5: Modified polymer d | 19.2 | 4.7 | 4.1 | 0 | 0 | 0 | 0 | 0 | 5.0 | 0 | −58 |
| Comparative Example 16: Modified polymer i | 18.9 | 4.5 | 4.2 | 0 | 0 | 0 | 0 | 0 | 0 | 5.0 | −56 |
| Example 23: Modified polymer O | 14.8 | 4.8 | 3.1 | 1.0 | 0.3 | 0.2 | 0.5 | 2.0 | 0 | 5.0 | −54 |
| Example 24: Modified polymer P | 15.4 | 4.9 | 3.1 | 1.0 | 0.2 | 0.0 | 0.0 | 1.2 | 0 | 5.0 | −54 |
| Comparative Example 17: Modified polymer j | 16.1 | 4.3 | 3.7 | 0 | 0 | 0 | 0 | 0 | 20 | 0 | −44 |
| Comparative Example 18: Modified polymer k | 15.7 | 4.1 | 3.8 | 0 | 0 | 0 | 0 | 0 | 10 | 10 | −40 |
| Example 25: Modified polymer Q | 14.1 | 4.9 | 2.9 | 1.0 | 0.3 | 0.2 | 0.5 | 2.0 | 10 | 10 | −38 |
| Example 26: Modified polymer R | 15.9 | 4.0 | 4.0 | 1.1 | 0.2 | 0.0 | 0.0 | 1.2 | 10 | 10 | −38 |
| Comparative Example 4: Modified polymer c | 17.1 | 4.3 | 4.0 | 0 | 0 | 0 | 0 | 0 | 25 | 0 | −40 |
| Comparative Example 19: Modified polymer m | 16.1 | 4.0 | 4.0 | 0 | 0 | 0 | 0 | 0 | 15 | 10 | −37 |
| Example 27: Modified polymer S | 14.0 | 4.9 | 2.9 | 1.0 | 0.3 | 0.2 | 0.5 | 2.0 | 15 | 10 | −35 |
| Example 28: Modified polymer T | 14.8 | 3.7 | 4.0 | 1.0 | 0.2 | 0.0 | 0.0 | 1.2 | 15 | 10 | −35 |
| Comparative Example 2: Modified polymer a | 15.1 | 4.9 | 3.1 | 1.0 | 0.3 | 0.2 | 0.5 | 2.0 | 0 | 0 | −60 |

As shown in Table 3, in the modified polymers I to T according to the examples, the glass transition point is high by introducing an epoxy group and a hydroxyl group as compared with the modified polymer a, and the glass transition point was increased as the total amount of the epoxy group and hydroxyl groups introduced is increased.

Examples 29 to 40 and Comparative Examples 20 to 26

Rubber Composition

Using Banbury mixer, rubber compositions were prepared according to the formulations (parts by mass) shown in Tables 4 and 5 below in the same manner as in First Example 1. The detail of each component in Table 4 and 5 excluding a rubber component is the same as in First Example. Using each rubber composition obtained, a test piece having a given shape was prepared by vulcanization at 160° C. for 20 minutes. Dynamic viscoelasticity test was conducted using the test piece obtained, and wet skid performance (tan δ (0° C.)) and rolling resistance performance (tan δ (60° C.)) were evaluated. Additionally, a tensile test was conducted, and modulus of elasticity M300 and tensile strength were evaluated. Each evaluation is the same as in First Example. Comparative Examples 7 to 12 in Tables 4 and 5 are common to First Example.

TABLE 4

| | Com. Ex. 7 | Com. Ex. 12 | Com. Ex. 20 | Ex. 29 | Ex. 30 | Com. Ex. 9 | Com. Ex. 21 | Com. Ex. 22 | Ex. 31 | Ex. 32 | Ex. 33 | Ex. 34 |
|---|---|---|---|---|---|---|---|---|---|---|---|---|
| Formulation (parts by mass) | | | | | | | | | | | | |
| Unmodified polymer (Comparative Example 1) | 100 | | | | | | | | | | | |
| Modified polymer e (Comparative Example 6) | | 100 | | | | | | | | | | |
| Modified polymer f (Comparative Example 13) | | | 100 | | | | | | | | | |
| Modified polymer I (Example 17) | | | | 100 | | | | | | | | |
| Modified polymer J (Example 18) | | | | | 100 | | | | | | | |
| Modified polymer b (Comparative Example 3) | | | | | | 100 | | | | | | |
| Modified polymer g (Comparative Example 14) | | | | | | | 100 | | | | | |
| Modified polymer h (Comparative Example 15) | | | | | | | | 100 | | | | |
| Modified polymer K (Example 19) | | | | | | | | | 100 | | | |
| Modified polymer L (Example 20) | | | | | | | | | | 100 | | |
| Modified polymer M (Example 21) | | | | | | | | | | | 100 | |
| Modified polymer N (Example 22) | | | | | | | | | | | | 100 |
| Silica | 50 | 50 | 50 | 50 | 50 | 50 | 50 | 50 | 50 | 50 | 50 | 50 |
| Carbon black | 10 | 10 | 10 | 10 | 10 | 10 | 10 | 10 | 10 | 10 | 10 | 10 |
| Silane coupling agent | 4 | 4 | 4 | 4 | 4 | 4 | 4 | 4 | 4 | 4 | 4 | 4 |
| Zinc flower | 2 | 2 | 2 | 2 | 2 | 2 | 2 | 2 | 2 | 2 | 2 | 2 |
| Process oil | 2 | 2 | 2 | 2 | 2 | 2 | 2 | 2 | 2 | 2 | 2 | 2 |
| Age resister | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 | 1.5 | 1.5 | 1.5 | 1.5 |
| Properties (Index) | | | | | | | | | | | | |
| Rolling resistance performance | 100 | 95 | 109 | 149 | 145 | 94 | 112 | 105 | 151 | 143 | 153 | 148 |
| Wet skid performance | 100 | 114 | 115 | 127 | 125 | 128 | 130 | 129 | 143 | 141 | 145 | 142 |
| Modulus of elasticity | 100 | 102 | 106 | 105 | 107 | 102 | 110 | 103 | 110 | 110 | 110 | 110 |
| Tensile strength | 100 | 103 | 106 | 113 | 111 | 103 | 108 | 104 | 115 | 112 | 115 | 112 |

TABLE 5

| | Com. Ex. 11 | Com. Ex. 23 | Ex. 35 | Ex. 36 | Com. Ex. 24 | Com. Ex. 25 | Ex. 37 | Ex. 38 | Com. Ex. 10 | Com. Ex. 26 | Ex. 39 | Ex. 40 | Com. Ex. 8 |
|---|---|---|---|---|---|---|---|---|---|---|---|---|---|
| Formulation (parts by mass) | | | | | | | | | | | | | |
| Modified polymer d (Comparative Example 5) | 100 | | | | | | | | | | | | |
| Modified polymer i (Comparative Example 16) | | 100 | | | | | | | | | | | |
| Modified polymer O (Example 23) | | | 100 | | | | | | | | | | |
| Modified polymer P (Example 24) | | | | 100 | | | | | | | | | |
| Modified polymer j (Comparative Example 17) | | | | | 100 | | | | | | | | |
| Modified polymer k (Comparative Example 18) | | | | | | 100 | | | | | | | |
| Modified polymer Q (Example 25) | | | | | | | 100 | | | | | | |
| Modified polymer R (Example 26) | | | | | | | | 100 | | | | | |
| Modified polymer c (Comparative Example 4) | | | | | | | | | 100 | | | | |
| Modified polymer m (Comparative Example 19) | | | | | | | | | | 100 | | | |
| Modified polymer S (Example 27) | | | | | | | | | | | 100 | | |
| Modified polymer T (Example 28) | | | | | | | | | | | | 100 | |
| Modified polymer a (Comparative Example 2) | | | | | | | | | | | | | 100 |
| Silica | 50 | 50 | 50 | 50 | 50 | 50 | 50 | 50 | 50 | 50 | 50 | 50 | 50 |
| Carbon black | 10 | 10 | 10 | 10 | 10 | 10 | 10 | 10 | 10 | 10 | 10 | 10 | 10 |
| Silane coupling agent | 4 | 4 | 4 | 4 | 4 | 4 | 4 | 4 | 4 | 4 | 4 | 4 | 4 |
| Zinc flower | 2 | 2 | 2 | 2 | 2 | 2 | 2 | 2 | 2 | 2 | 2 | 2 | 2 |
| Process oil | 2 | 2 | 2 | 2 | 2 | 2 | 2 | 2 | 2 | 2 | 2 | 2 | 2 |
| Age resister | 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 | 1.5 | 1.5 | 1.5 | 1.5 | 1.5 |
| Properties (Index) | | | | | | | | | | | | | |
| Rolling resistance performance | 97 | 108 | 147 | 145 | 92 | 113 | 154 | 151 | 88 | 110 | 150 | 148 | 142 |
| Wet skid performance | 107 | 108 | 124 | 122 | 142 | 143 | 147 | 145 | 170 | 174 | 198 | 194 | 120 |
| Modulus of elasticity | 101 | 104 | 106 | 106 | 103 | 109 | 109 | 109 | 105 | 111 | 108 | 107 | 103 |
| Tensile strength | 101 | 104 | 107 | 107 | 103 | 107 | 114 | 113 | 104 | 107 | 114 | 114 | 105 |

The results are shown in Table 4 and Table 5. The modified rubber a having the linking groups represented by the formulae (1) to (4) obtained by subjecting natural rubber to dissociation combining was used in Comparative Example 8. Therefore, rolling resistance performance was more excellent and wet performance was improved, as compared with Comparative Example 7 using unmodified natural rubber. On the other hand, in Comparative Examples 12, 9, 11, 24 and 10 using the epoxidized natural rubbers (modified rubbers e, b, d, j and c), wet performance was improved as compared with Comparative Example 7, but tan δ at 60° C. was higher, and rolling resistance performance was poorer. Furthermore, in Comparative Examples 20 to 23, 25 and 26 using the hydroxylated epoxidized natural rubbers obtained by hydroxylating the epoxy groups (modified rubbers f, g, h, i, k and m), rolling resistance performance was improved by the introduction of the hydroxyl groups as compared with the respective comparative examples, but its effect was small. Contrary to this, in Examples 29 to 40 using the modified rubbers I to T obtained by subjecting natural rubber to dissociation combining, followed by epoxidizing and further hydroxylating, rolling resistance performance and wet performance were remarkably improved as compare with Comparative Example 7. Furthermore, in Examples 29 to 40, improvement effect was observed in rolling resistance performance and/or wet performance as compared with Comparative Example 8 as well as with Comparative Examples 9 to 12 and 20 to 26 using mere epoxidized natural rubber or hydroxylated epoxidized natural rubber. Furthermore, in Examples 29 to 40, modulus of elasticity and tensile strength were high and reinforcing property was excellent. Therefore, reinforcing property, wet skid performance and rolling resistance performance could be achieved together in high level.

INDUSTRIAL APPLICABILITY

The modified diene polymer according to the present invention can be used as a polymer component added to various polymer compositions including a rubber composition.

The invention claimed is:

1. A method for procuring a modified diene polymer, comprising:
    decomposing a diene polymer having a carbon-carbon double bond in a main chain by oxidative cleavage of the carbon-carbon double bond, thereby obtaining polymer fragments having reduced molecular weight,
    changing acido-basic properties of a system containing the polymer fragments such that the system is changed into a basic system when the system is acidic and the system is changed into an acidic system when the system is basic to combine the polymer fragments, thereby obtaining an intermediate polymer having an altered structure, and
    epoxidizing a carbon-carbon double bond moiety in a main chain of the intermediate polymer.

2. The method for producing a modified diene polymer according to claim 1, comprising hydroxylating at least a part of epoxy groups formed by the epoxidizing.

3. A method for producing a modified diene polymer, comprising:
using a diene polymer having a carbon-carbon double bond in a main chain and further having epoxy groups formed by oxidation of a double bond moiety of the main chain,
decomposing the diene polymer by oxidative cleavage of the carbon-carbon double bond to obtain polymer fragments having reduced molecular weight, and
changing acido-basic properties of a system containing the polymer fragments such that the system is changed into a basic system when the system is acidic and the system is changed into an acidic system when the system is basic to combine the polymer fragments, thereby obtaining a polymer having an altered structure.

4. The method for producing a modified diene polymer according to claim 3, comprising hydroxylating at least a part of the epoxy groups.

5. The method for producing a modified diene polymer according to claim 1, wherein the polymer fragments obtained by the oxidative cleavage contains a structure represented by the following formula (5) at a terminal:

wherein $R^1$ is hydrogen atom, an alkyl group having from 1 to 5 carbon atoms, or a halogen group.

6. The method for producing a modified diene polymer according to claim 1, wherein the modified diene polymer has at least one linking group selected from the group consisting of linking groups represented by the following formulae (1) to (4) in the molecule and has a structure in which diene polymer chains containing epoxy groups formed by oxidation of a double bond moiety of a main chain and/or hydroxyl groups directly bonded to the main chain are linked through the linking group

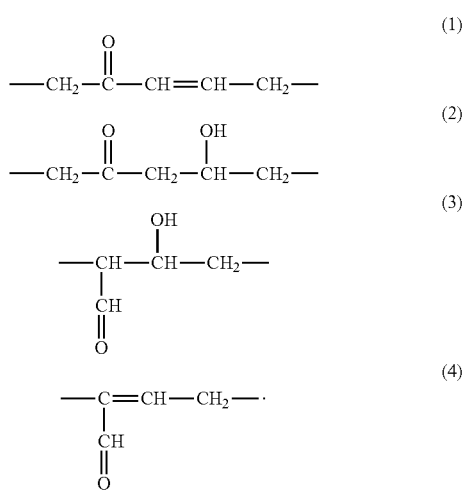

7. A modified diene polymer obtained by the production method according to claim 1.

8. A modified diene polymer having at least one linking group selected from the group consisting of linking groups represented by the following formulae (1) to (4) in the molecule and having a structure in which diene polymer chains containing epoxy groups formed by oxidation of a double bond moiety of a main chain and/or hydroxyl groups directly bonded to the main chain are linked through the linking group

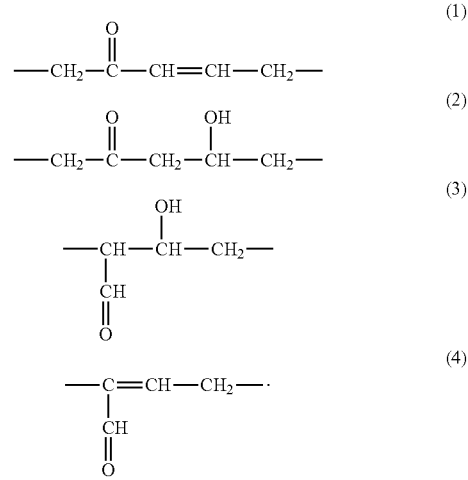

9. The modified diene polymer according to claim 8, wherein the diene polymer chain contains epoxy groups formed by oxidation of a double bond moiety of the main chain.

10. The modified diene polymer according to claim 9, wherein the glass transition temperature is from −60° C. to −40° C.

11. The modified diene polymer according to claim 9, wherein the content of the epoxy groups is from 5 to 25 mol %.

12. The modified diene polymer according to claim 8, wherein the diene polymer chain is constituted of an isoprene unit represented by the following formula (8) and an epoxidized isoprene unit represented by the following formula (9)

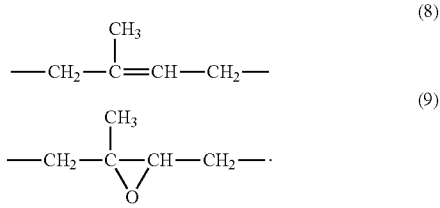

13. The modified diene polymer according to claim 8, wherein the diene polymer chain contains hydroxyl groups directly bonded to the main chain.

14. The modified diene polymer according to claim 13, wherein the diene polymer chain contains epoxy groups formed by oxidation of a double bond moiety of the main chain together with the hydroxyl groups.

15. The modified diene polymer according to claim 8, wherein the diene polymer chain has at least one of a constituting unit represented by the following formula (10) or a constituting unit represented by the following formula (11)

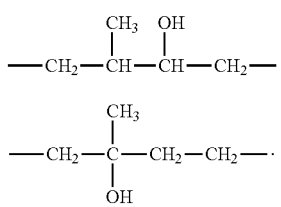

(10)

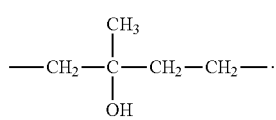

(11)

16. The modified diene polymer according to claim 15, wherein the diene polymer chain further has a constituting unit represented by the following formula (9)

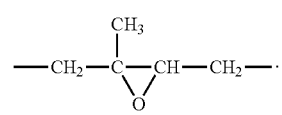

(9)

17. The modified diene polymer according to claim 13 wherein the content of the hydroxyl groups is from 1 to 15 mol %.

18. The modified diene polymer according to claim 14, wherein the content of the hydroxyl groups is from 1 to 15 mol % and the content of the epoxy groups is from 1 to 20 mol %.

19. A rubber composition comprising a filler in an amount of from 5 to 150 parts by mass per 100 parts by mass of a rubber component comprising the modified diene polymer according to claim 8.

20. A pneumatic tire using the rubber composition according to claim 19.

21. A pneumatic tire using the rubber composition according to claim 19 in a tread.

22. The method for producing a modified diene polymer according to claim 3, wherein the polymer fragments obtained by the oxidative cleavage contains a structure represented by the following formula (5) at a terminal:

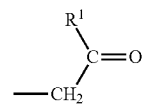

(5)

wherein $R^1$ is hydrogen atom, an alkyl group having from 1 to 5 carbon atoms, or a halogen group.

23. The method for producing a modified diene polymer according to claim 3, wherein the modified diene polymer has at least one linking group selected from the group consisting of linking groups represented by the following formulae (1) to (4) in the molecule and has a structure in which diene polymer chains containing epoxy groups formed by oxidation of a double bond moiety of a main chain and/or hydroxyl groups directly bonded to the main chain are linked through the linking group

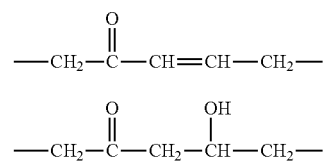

(1)

(2)

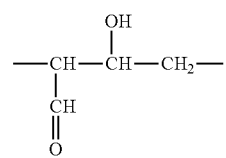

(3)

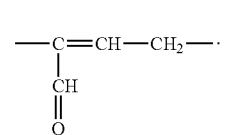

(4)

* * * * *